United States Patent
Naito et al.

(10) Patent No.: US 12,258,534 B2
(45) Date of Patent: Mar. 25, 2025

(54) VISCOSITY INDEX IMPROVER AND LUBRICATING OIL COMPOSITION

(71) Applicant: SANYO CHEMICAL INDUSTRIES, LTD., Kyoto (JP)

(72) Inventors: Nobuhiro Naito, Kyoto (JP); Satoshi Matsumoto, Kyoto (JP); Masahiro Hashimoto, Kyoto (JP); Kenyuu Yoshida, Kyoto (JP); Hiroki Yamashita, Kyoto (JP); Ryota Sato, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 0 days.

(21) Appl. No.: 18/025,430

(22) PCT Filed: Sep. 14, 2021

(86) PCT No.: PCT/JP2021/033641
§ 371 (c)(1),
(2) Date: Mar. 9, 2023

(87) PCT Pub. No.: WO2022/054957
PCT Pub. Date: Mar. 17, 2022

(65) Prior Publication Data
US 2023/0323241 A1    Oct. 12, 2023

(30) Foreign Application Priority Data

Sep. 14, 2020 (JP) ................. 2020-154046

(51) Int. Cl.
*C10M 169/04* (2006.01)
*C10M 145/14* (2006.01)
(Continued)

(52) U.S. Cl.
CPC ...... *C10M 169/041* (2013.01); *C10M 145/14* (2013.01); *C10M 149/10* (2013.01);
(Continued)

(58) Field of Classification Search
CPC ............. C10M 145/14; C10M 149/10; C10M 169/041; C10M 2203/003; C10M 2203/1006; C10M 2207/2815; C10M 2207/2825; C10M 2209/084; C10M 2217/028; C10N 2020/02; C10N 2020/04; C10N 2030/02; C10N 2040/04; C10N 2040/08; C10N 2040/25
See application file for complete search history.

(56) References Cited

U.S. PATENT DOCUMENTS 3,115,463 A * 12/1963 Orloff et al. ............ C10M 1/08
                                                   252/400.24
5,188,770 A    2/1993 Pennewiss
(Continued)

FOREIGN PATENT DOCUMENTS

CN    107075401    8/2017
CN    109912756    6/2019
(Continued)

OTHER PUBLICATIONS

International Search Report issued Nov. 22, 2021 in International (PCT) Application No. PCT/JP2021/033641.

*Primary Examiner* — James C Goloboy
(74) *Attorney, Agent, or Firm* — WENDEROTH, LIND & PONACK, L.L.P.

(57) ABSTRACT

The present invention aims to provide a viscosity-index improving agent having an excellent friction reduction effect to reduce friction of a lubricating oil composition when the viscosity-index improving agent is added thereto. The present also aims to provide a lubricating oil composition containing the viscosity-index improving agent. The present invention relates to, for example, a viscosity-index improving agent containing: (co)polymer (A) containing, as an essential constituent monomer, a polyolefin-based monomer (a) represented by the following formula (1); an ester oil (B1) having a kinematic viscosity at 100° C. of 1.00 to 2.50 mm²/s; and an ester oil (B2) having a kinematic viscosity at 100° C. of 2.51 to 5.00 mm²/s:

[Chem. 1]

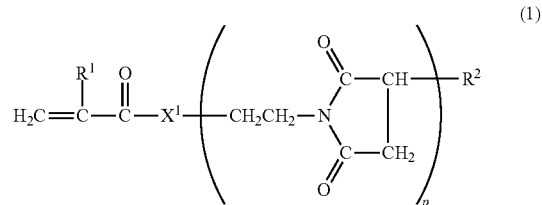

(1)

wherein $R^1$ is a hydrogen atom or a methyl group; $—X^1—$ is a group represented by $—O—$, $—O(AO)_m-$, or $—NH—$, A is a C2-C4 alkylene group, m is an integer of 1 to 10, and each A may be the same or different when m is 2 or more; $R^2$ is a residue after removal of one hydrogen atom from a hydrocarbon polymer containing a 1,2-butylene group as a structural unit; and p represents a number of 0 or 1.

9 Claims, No Drawings

(51) Int. Cl.
  *C10M 149/10* (2006.01)
  *C10N 20/02* (2006.01)
  *C10N 20/04* (2006.01)
  *C10N 30/02* (2006.01)
  *C10N 40/04* (2006.01)
  *C10N 40/08* (2006.01)
  *C10N 40/25* (2006.01)

(52) U.S. Cl.
  CPC ............... *C10M 2203/003* (2013.01); *C10M 2203/1006* (2013.01); *C10M 2207/2815* (2013.01); *C10M 2207/2825* (2013.01); *C10M 2209/084* (2013.01); *C10M 2217/028* (2013.01); *C10N 2020/02* (2013.01); *C10N 2020/04* (2013.01); *C10N 2030/02* (2013.01); *C10N 2040/04* (2013.01); *C10N 2040/08* (2013.01); *C10N 2040/25* (2013.01)

(56) References Cited

U.S. PATENT DOCUMENTS

| | | | |
|---|---|---|---|
| 5,571,445 A * | 11/1996 | Srinivasan | C10M 133/46 |
| | | | 508/195 |
| 9,683,195 B2 * | 6/2017 | Nakada | C10M 149/10 |
| 2002/0123583 A1 | 9/2002 | Gore et al. | |
| 2003/0153472 A1 * | 8/2003 | Nagano | F16C 33/104 |
| | | | 508/496 |
| 2008/0194443 A1 | 8/2008 | Stohr et al. | |
| 2010/0062954 A1 * | 3/2010 | Fujita | C10M 105/04 |
| | | | 585/10 |
| 2017/0009177 A1 | 1/2017 | Nakada et al. | |
| 2017/0166830 A1 | 6/2017 | Taribagil et al. | |
| 2017/0335232 A1 | 11/2017 | Kaneko | |
| 2018/0251701 A1 | 9/2018 | Taribagil et al. | |
| 2019/0177640 A1 | 6/2019 | Klein et al. | |
| 2019/0177641 A1 | 6/2019 | Klein et al. | |

FOREIGN PATENT DOCUMENTS

| | | |
|---|---|---|
| EP | 0 570 093 | 11/1993 |
| JP | 7-62372 | 3/1995 |
| JP | 2732187 | 3/1998 |
| JP | 2941392 | 8/1999 |
| JP | 2004-307551 | 11/2004 |
| JP | 2005-200454 | 7/2005 |
| JP | 2006-8842 | 1/2006 |
| JP | 2008-546894 | 12/2008 |
| JP | 2012-529550 | 11/2012 |
| JP | 5591327 | 9/2014 |
| JP | 2017-57378 | 3/2017 |
| JP | 2017-106017 | 6/2017 |
| JP | 2017-110196 | 6/2017 |
| JP | 2017-171899 | 9/2017 |
| JP | 2018-48328 | 3/2018 |
| JP | 2019-151766 | 9/2019 |
| JP | 2019-156953 | 9/2019 |
| JP | 2019-532134 | 11/2019 |
| JP | 2019-535858 | 12/2019 |
| WO | 2010/142789 | 12/2010 |
| WO | 2018/041755 | 3/2018 |
| WO | 2018/083027 | 5/2018 |

* cited by examiner

VISCOSITY INDEX IMPROVER AND LUBRICATING OIL COMPOSITION

TECHNICAL FIELD

The present invention relates to a viscosity-index improving agent and a lubricating oil composition.

BACKGROUND ART

Nowadays, there is an increasing demand for lower fuel consumption of vehicles in order to reduce the amount of $CO_2$ emission and protect petroleum resources. One approach to reduce the fuel consumption is a reduction in viscous resistance of an engine oil by lowering its viscosity. However, a lower viscosity causes concern for mechanical protection in terms of oil leakage and seizure. The standard for engine oil viscosity (SAE J300) by SAE International (USA) defines grade OW-20 oil and grade OW-16 oil as having a high temperature high shear (HTHS) viscosity at 150° C. (ASTM D4683 or D5481) of 2.6 mPa·s or more and 2.3 mPa·s or more, respectively. To lower the fuel consumption, there is a demand for an engine oil that satisfies the above standard and that also has an even lower HTHS viscosity at an effective temperature of 80° C. or 100° C. Further, there is a demand for an engine oil having good frictional characteristics in order to reduce friction and wear of the engine.

A method of adding a viscosity-index improving agent to a lubricating oil has been widely used as a method of improving the viscosity characteristics. Known examples of such a viscosity-index improving agent include methacrylate ester copolymers (Patent Literatures 1 to 4), an olefin copolymer (Patent Literature 5), and a macromonomer copolymer (Patent Literature 6). A viscosity-index improving agent containing a diluent oil and an ester oil is also known (Patent Literature 7).

However, these viscosity-index improving agents are still insufficient in terms of viscosity reduction in an effective temperature range and friction characteristics when added to an engine oil composition.

CITATION LIST

Patent Literature

Patent Literature 1: JP 2732187 B
Patent Literature 2: JP 2941392 B
Patent Literature 3: JP H7-62372 A
Patent Literature 4: JP 2004-307551 A
Patent Literature 5: JP 2005-200454 A
Patent Literature 6: JP 2008-546894 A
Patent Literature 7: JP 5591327 B

SUMMARY OF INVENTION

Technical Problem

The present invention aims to provide a viscosity-index improving agent having an excellent friction reducing effect to reduce friction of a lubricating oil composition when the viscosity-index improving agent is added thereto. The present invention also aims to provide a lubricating oil composition containing the viscosity-index improving agent.

Solution to Problem

As a result of extensive studies, the present inventors completed the present invention.

Specifically, the present invention provides a viscosity-index improving agent containing: a (co)polymer (A) containing, as an essential constituent monomer, a polyolefin-based monomer (a) represented by the following formula (1); an ester oil (B1) having a kinematic viscosity at 100° C. of 1.00 to 2.50 mm²/s; and an ester oil (B2) having a kinematic viscosity at 100° C. of 2.51 to 5.00 mm²/s; and a lubricating oil composition containing the viscosity-index improving agent and at least one additive selected from the group consisting of a detergent, a dispersant, an antioxidant, an oiliness improver, a pour point depressant, a friction and wear modifier, an extreme pressure agent, a defoamer, a demulsifier, a metal deactivator, and a corrosion inhibitor:

[Chem. 1]

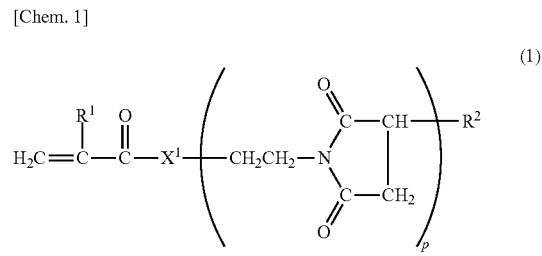

wherein $R^1$ is a hydrogen atom or a methyl group; $—X^1—$ is a group represented by $—O—$, $—O(AO)_m-$, or $—NH—$, A is a C2-C4 alkylene group, m is an integer of 1 to 10, and each A may be the same or different when m is 2 or more; $R^2$ is a residue after removal of one hydrogen atom from a hydrocarbon polymer containing a 1,2-butylene group as a structural unit; and p represents a number of 0 or 1.

Advantageous Effects of Invention

The lubricating oil composition containing the viscosity-index improving agent of the present invention advantageously has an excellent friction reducing effect.

DESCRIPTION OF EMBODIMENTS

The viscosity-index improving agent of the present invention contains: a (co)polymer (A) containing, as an essential constituent monomer, a polyolefin-based monomer (a) represented by the following formula (1); an ester oil (B1) having a kinematic viscosity at 100° C. of 1.00 to 2.50 mm²/s; and an ester oil (B2) having a kinematic viscosity at 100° C. of 2.51 to 5.00 mm²/s:

[Chem. 2]

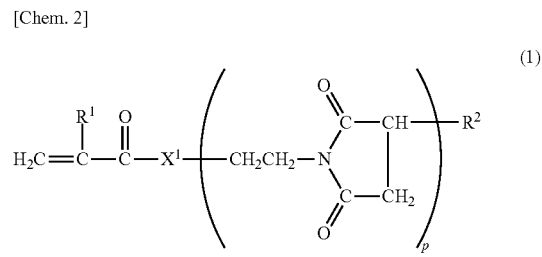

wherein $R^1$ is a hydrogen atom or a methyl group; $—X^1—$ is a group represented by $—O—$, $—O(AO)_m-$, or $—NH—$, A is a C2-C4 alkylene group, m is an integer of 1 to 10, and each A may be the same or different when m is 2 or more; $R^2$ is a residue after removal of one hydrogen atom from a hydrocarbon polymer containing a 1,2-butylene group as a structural unit; and p represents a number of 0 or 1.

<(Co)polymer (A)>

The viscosity-index improving agent of the present invention contains a (co)polymer (A) containing, as a constituent monomer, a polyolefin-based monomer (a) represented by the above formula (1).

The term "(co)polymer" as used in the present invention refers to a homopolymer and/or a copolymer.

The polyolefin-based monomer (a) represented by the formula (1) is now described.

$R^1$ in the formula (1) is a hydrogen atom or a methyl group. Of these, a methyl group is preferred in terms of viscosity index improving effect.

—$X^1$— in the formula (1) is a group represented by —O—, —O(AO)$_m$-, or —NH—.

A is a C2-C4 alkylene group. Examples include ethylene, 1,2- or 1,3-propylene, isobutylene, and 1,2-, 1,3- or 1,4-butylene groups.

AO is a C2-C4 alkyleneoxy group. Examples include ethyleneoxy, 1,2- or 1,3-propyleneoxy, isobutyleneoxy, and 1,2-, 1,3- or 1,4-butyleneoxy groups.

m is the number of moles of an alkylene oxide added, and it is an integer of 1 to 10. In terms of viscosity index improving effect, it is preferably an integer of 1 to 4, more preferably 1 or 2.

When m is 2 or more, each A may be the same or different, and each AO in the (AO)$_m$ moiety may be bonded in a random form or a block form.

In terms of viscosity index improving effect, —$X^1$— is preferably a group represented by —O— or —O(AO)$_m$-, more preferably a group represented by —O— or —O(CH$_2$CH$_2$O)$_1$—.

p represents a number of 0 or 1.

$R^2$ in the formula (1) is a residue after removal of one hydrogen atom from a hydrocarbon polymer containing a 1,2-butylene group (—CH$_2$CH(CH$_2$CH$_3$)— or CH(CH$_2$CH$_3$)CH$_2$—) as an essential structural unit.

In the hydrocarbon polymer containing a 1,2-butylene group as a structural unit, the proportion of the 1,2-butylene group in the total structural units is preferably 10 to 90 mol %, more preferably 20 to 80 mol %, in terms of HTHS viscosity at 100° C.

When the hydrocarbon polymer containing a 1,2-butylene group as a structural unit contains two hydrocarbon polymers with different proportions of 1,2-butylene groups, the absolute difference in proportion between the two 1,2-butylene groups is preferably 10 to 80 mol %, more preferably 20 to 70 mol %, in terms of low-temperature viscosity.

The hydrocarbon polymer containing a 1,2-butylene group as a structural unit is preferably one having a carbon number of 37 or more. Examples include a polymer containing 1-butene as a constituent monomer (unsaturated hydrocarbon (x)) and a polymer obtained by hydrogenating a carbon-carbon double bond of a 1,2-adduct polymer of 1,3-butadiene.

Regarding the hydrocarbon polymer containing a 1,2-butylene group as a structural unit in the formula (1), the proportion of the 1,2-butylene group in the total structural units can be measured by $^{13}$C-NMR. Specifically, the proportion can be determined by analyzing the hydrocarbon polymer by $^{13}$C-NMR and calculating by the following formula (1). In $^{13}$C-NMR, a peak derived from the tertiary carbon atom of the 1,2-butylene group appears at an integral value of 26 to 27 ppm (integral value B). The proportion of the 1,2-butylene group can be determined from the integral value of the peak and an integral value (integral value C) of all carbon peaks of the hydrocarbon polymer.

Proportion of 1,2-butylene group (mol %)={(integral value $B$)×4}/(integral value $C$)×100 (1)

The proportion of the 1,2-butylene group can be adjusted as follows: for example, in the case of anionic polymerization using 1,3-butadiene, the proportion of the 1,2-butylene group can be increased by setting the reaction temperature to a temperature lower than or equal to the boiling point (−4.4° C.) of 1,3-butadiene and adding a polymerization initiator in an amount smaller than that of 1,3-butadiene, whereas the proportion of the 1,2-butylene group can be decreased by setting the reaction temperature to a temperature higher than or equal to the boiling point of 1,3-butadiene and adding a polymerization initiator in an amount larger than that of 1,3-butadiene.

In terms of viscosity index improving effect, the proportion of 1,3-butadiene of all monomers constituting $R^2$ in the formula (1) (weight percentage of 1,3-butadiene among all constituent monomers of the hydrocarbon polymer containing a 1,2-butylene group as a structural unit) is preferably 50 wt % or more, more preferably 75 wt % or more, particularly preferably 85 wt % or more, most preferably 90 wt % or more.

In the structure derived from 1,3-butadiene constituting a portion or the entirety of $R^2$ in the formula (1), the molar ratio (1,2-adduct/1,4-adduct) of a 1,2-butylene group (1,2-adduct) to a 1,4-butylene group (1,4-adduct) is preferably 1/99 to 99/1, more preferably 10/90 to 90/10, particularly preferably 20/80 to 80/20, in terms of viscosity index improving effect and low-temperature viscosity.

Preferably, the monomer (a) includes one having a molar ratio (1,2-adduct/1,4-adduct) of 1/99 to 50/50 and one having a molar ratio (1,2-adduct/1,4-adduct) of 51/49 to 99/1. More preferably, the monomer (a) includes one having a molar ratio (1,2-adduct/1,4-adduct) of 10/90 to 50/50 and one having a molar ratio (1,2-adduct/1,4-adduct) of 55/45 to 90/10.

The molar ratio of a 1,2-adduct to a 1,4-adduct in the structure derived from 1,3-butadiene constituting a part or the entirety of $R^2$ in the formula (1) can be measured by $^1$H-NMR, $^{13}$C-NMR, Raman spectroscopy, or the like.

In terms of low-temperature viscosity, $R^2$ in the formula (1) is preferably a residue after removal of one hydrogen atom from a hydrocarbon polymer containing a 1,2-butylene group and an isobutylene group as structural units. A hydrocarbon polymer containing an isobutylene group as a structural unit can be obtained by a method using isobutene as a constituent monomer (unsaturated hydrocarbon (x)), for example.

In terms of low-temperature viscosity, the total proportion of the isobutylene group and the 1,2-butylene group in the hydrocarbon polymer based on the total number of structural units of the hydrocarbon polymer is preferably 30 mol % or more, more preferably 40 mol % or more, particularly preferably 50 mol % or more, most preferably 60 mol % or more.

The total proportion of the isobutylene group and the 1,2-butylene group based on the total number of structural units of the hydrocarbon polymer can be determined by analyzing the hydrocarbon polymer by $^{13}$C-nuclear magnetic resonance spectrum and calculating by the following formula (2). Specifically, for example, if the monomers include only those having a carbon number of 4, a $^{13}$C-nuclear magnetic resonance spectrum shows a peak derived from a methyl group of the isobutylene group at an integral value of 30 to 32 ppm (integral value A) and a peak derived from the tertiary carbon atom of the 1,2-butylene group at an integral value of 26 to 27 ppm (integral value B). The total proportion can be determined from the integral value of the peak and an integral value (integral value C) of all carbon peaks of the hydrocarbon polymer.

Total proportion (mol %) of isobutylene group and 1,2-butylene group={(integral value $A$)×2+(integral value $B$)×4}/(integral value $C$)×100   (2)

The hydrocarbon polymer containing a 1,2-butylene group as a structural unit may contain, as constituent monomers, the following monomers (1) to (3) as the unsaturated hydrocarbons (x) in addition to 1-butene and 1,3-butadiene.

(1) Aliphatic unsaturated hydrocarbon (e.g., C2-C36 olefins (e.g., ethylene, propylene, 2-butene, isobutene, pentene, heptene, diisobutylene, octene, dodecene, octadecene, triacontene, and hexatriacontene) and C4-C36 dienes (e.g., isoprene, 1,4-pentadiene, 1,5-hexadiene, and 1,7-octadiene))

(2) Alicyclic unsaturated hydrocarbon (e.g., cyclohexene, (di)cyclopentadiene, pinene, limonene, indene, vinylcyclohexane, and ethylidenebicycloheptene)

(3) Aromatic group-containing unsaturated hydrocarbon (e.g., styrene, α-methylstyrene, vinyltoluene, 2,4-dimethylstyrene, ethylstyrene, isopropylstyrene, butylstyrene, phenylstyrene, cyclohexylstyrene, benzylstyrene, crotylbenzene, vinylnaphthalene, divinylbenzene, divinyltoluene, divinylxylene, and trivinylbenzene).

A hydrocarbon polymer composed of any of these monomers may be a block polymer or a random polymer. When the hydrocarbon polymer has a carbon-carbon double bond, the double bond may be partially or completely hydrogenated by adding hydrogen. In one embodiment, the hydrocarbon polymer in $R^2$ may be a hydrocarbon polymer containing only a C4 monomer as a constituent monomer, and the C4 monomer may be 1-butene and/or 1,3-butadiene and may contain isobutene, if necessary.

The weight percentage of unsaturated hydrocarbons other than 1-butene, 1,3-butadiene, and isobutene in the monomer (a) is preferably 50 wt % or less, more preferably 25 wt % or less, still more preferably 15 wt % or less, particularly preferably 10 wt % or less.

The weight average molecular weight (hereinafter abbreviated as Mw) and the number average molecular weight (hereinafter abbreviated as Mn) of the monomer (a) can be measured by gel permeation chromatography (hereinafter abbreviated as GPC) under the following conditions.
<Measuring Conditions for Mw and Mn of Monomer (a)>
  Device: "HLC-8320GPC" (available from Tosoh Corporation)
  Column: "TSKgel GMHXL" (available from Tosoh Corporation) two columns
  "TSKgel Multipore HXL-M" (available from Tosoh Corporation) one column
  Measurement temperature: 40° C.
  Sample solution: 0.25 wt % tetrahydrofuran solution
  Volume of solution injected: 10.0 μl
  Detecting device: refractive index detector
  Reference material: standard polystyrene (TS reference material: standard polystyrene (TSKstandard POLYSTYRENE) 12 samples (molecular weight: 589, 1,050, 2,630, 9,100, 19,500, 37,900, 96,400, 190,000, 355,000, 1,090,000, 2,110,000, 4,480,000) (available from Tosoh Corporation)

The Mn of the monomer (a) is preferably 800 to 10,000, more preferably 1,000 to 9,000, still more preferably 1,200 to 8,500.

When the monomer (a) has a Mn of 800 or more, the viscosity index improving effect tends to be good. When the monomer (a) has a Mn of 10,000 or less, the shear stability tends to be good for long time use.

In terms of low-temperature viscosity, the Mw of the monomer (a) is preferably 900 to 13,000, more preferably 1,200 to 12,000, particularly preferably 1,500 to 11,000.

The monomer (a) can be obtained by esterification of a polymer (Y) having a hydroxy group at one end {one obtained by introducing a hydroxy group to one end of a hydrocarbon polymer} with (meth)acrylic acid or can be obtained by transesterification of the polymer (Y) with a (meth)acrylic alkyl (preferably C1-C4 alkyl) ester such as methyl (meth)acrylate, for example.

The term "(meth)acrylic acid" refers to acrylic acid and/or methacrylic acid.

In terms of solubility in the lubricating oil, the solubility parameter (hereinafter abbreviated as SP) of a structural unit derived from the monomer (a) (a structure in which vinyl group moieties of the monomer (a) are reacted to form a single bond) is preferably 7.0 to 9.0 $(cal/cm^3)^{1/2}$, more preferably 7.3 to 8.5 $(cal/cm^3)^{1/2}$.

The SP in the present invention is a value calculated according to the method described in Fedors method (Polymer Engineering and Science, February 1974, Vol. 14, No. 2, pp. 147 to 154) by substituting values (heat of vaporization and molar volume of atoms or functional groups at 25° C.) described on page 153 (Table 5) into formula (28) on page 153 of the same journal. Specifically, the SP can be calculated by substituting numerical values corresponding to the types of atoms and atomic groups in the molecular structure among the numerical values of $\Delta e_i$ and $\Delta v_i$ (Fedors's parameters) described in the following Table 1 into the following formula.

$$SP = (\Sigma \Delta e_i / \Sigma \Delta v_i)^{1/2}$$

TABLE 1

| Atom or group | $\Delta e_i$ cal/mole | $\Delta v_i$ cm$^3$/mole |
| --- | --- | --- |
| CH$_3$ | 1125 | 33.5 |
| CH$_2$ | 1180 | 16.1 |
| CH | 820 | −1.0 |
| C | 350 | −19.2 |
| H$_2$C = | 1030 | 28.5 |
| ⌷CH = | 1030 | 13.5 |
| C = | 1030 | −5.5 |
| HC = | 920 | 27.4 |
| ⌷C = | 1690 | 6.5 |
| Phenyl* | 7630 | 71.4 |
| Phenylene (o, m, p)* | 7630 | 52.4 |
| Phenyl (trisubstituted)* | 7630 | 33.4 |
| Phenyl (tetrasubstituted)* | 7630 | 14.4 |
| Phenyl (pentasubstituted)* | 7630 | −4.6 |
| Phenyl (hexasubstituted)* | 7630 | −23.6 |
| Ring closure 5 or more atoms | 250 | 16 |
| Ring closure 3 or 4 atoms | 750 | 18 |
| Conjugation in ring for each double bond | 400 | −2.2 |
| Halogen attached to carbon atom with double bond | −20 percent of $\Delta e_i$ of halogen | 4.0 |
| CO$_3$ (carbonate) | 4200 | 22.0 |
| COOH | 6600 | 28.5 |
| CO$_2$ | 4300 | 18.0 |
| CO | 4150 | 10.8 |
| CHO (aldehyde) | 5100 | 22.3 |
| CO$_2$CO$_2$ (oxalate) | 6400 | 37.3 |

TABLE 1-continued

| Atom or group | Δ $e_i$ cal/mole | Δ $v_i$ cm³/mole |
|---|---|---|
| C$_2$O$_3$ (anhydride) | 7300 | 30.0 |
| HCOO (formate) | 4300 | 32.5 |
| CONH$_2$ | 10000 | 17.5 |
| CONH | 8000 | 9.5 |
| CON | 7050 | −7.7 |
| HCON | 6600 | 11.3 |
| HCONH | 10500 | 27.0 |
| COCl | 5000 | 38.0 |
| NH$_2$ | 3000 | 19.2 |
| NH | 2000 | 4.5 |
| N | 1000 | −9.0 |
| N = | 2800 | 5.0 |
| CN | 6100 | 24.0 |
| NO$_2$ (aliphatic) | 7000 | 24.0 |
| NO$_2$ (aromatic) | 3670 | 32.0 |
| NO$_3$ | 5000 | 33.5 |
| NO$_2$ (nitrite) | 2800 | 33.5 |
| SCN | 4800 | 37.0 |
| NCO | 6800 | 35.0 |
| NF$_2$ | 1830 | 33.1 |
| NF | 1210 | 24.5 |
| O | 800 | 3.8 |
| OH | 7120 | 10.0 |
| OH (disubstituted or on adjacent C atoms) | 5220 | 13.0 |
| PO$_4$ | 5000 | 28.0 |
| PO$_3$ | 3400 | 22.7 |
| SH | 3450 | 28.0 |
| S | 3380 | 12 |
| S$_2$ | 5700 | 23.0 |
| SO$_3$ | 4500 | 27.6 |
| SO$_4$ | 6800 | 31.6 |
| F | 1000 | 18.0 |
| F (disubstituted) | 850 | 20.0 |
| F (trisubstituted) | 550 | 22.0 |
| CF$_2$ (for perfluoro compounds) | 1020 | 23.0 |
| CF$_3$ (for perfluoro compounds) | 1020 | 57.5 |
| Cl | 2760 | 24.0 |
| Cl (disubstituted) | 2300 | 26.0 |
| Cl (trisubstituted) | 1800 | 27.3 |
| Br | 3700 | 30.0 |
| Br (disubstituted) | 2950 | 31.0 |
| Br (trisubstituted) | 2550 | 32.4 |
| I | 4550 | 31.5 |
| I (disubstituted) | 4000 | 33.3 |
| I (trisubstituted) | 3900 | 37.0 |
| B | 3300 | −2.0 |
| Al | 3300 | −2.0 |
| Ga | 3300 | −2.0 |
| In | 3300 | −2.0 |
| Tl | 3300 | −2.0 |
| Si | 810 | 0 |
| Ge | 1930 | −1.5 |
| Sn | 2700 | 1.5 |
| Pb | 4100 | 2.5 |
| P | 2250 | −1.0 |
| As | 3100 | 7.0 |
| Sb | 3900 | 8.9 |
| Bi | 5100 | 9.5 |
| Se | 4100 | 16.0 |
| Te | 4800 | 17.4 |
| Zn | 3460 | 2.5 |
| Cd | 4250 | 6.5 |
| Hg | 5450 | 7.5 |

The SP of the structural unit derived from the monomer (a) can be calculated using the parameters described above based on the molecular structure of the structural unit derived from the monomer (a). The SP can be adjusted to a desired range by suitably adjusting the monomers (unsaturated hydrocarbons ((x)) for use and the weight fractions of the monomers.

Specific examples of the polymer (Y) having a hydroxy group at one end include the following (Y1) to (Y4).

Alkylene oxide adduct (Y1): Examples include a product obtained by adding an alkylene oxide (e.g., ethylene oxide or propylene oxide) to a polymer obtained by polymerizing the unsaturated hydrocarbon (x) in the presence of an ionic polymerization catalyst (e.g., lithium catalyst and sodium catalyst) (e.g., one represented by the formula (1) in which —$X^1$— is -(AO)$_m$- and p is 0).

Hydroborated product (Y2): Examples include a reaction product obtained by hydroboration of a polymer of the unsaturated hydrocarbon (x) having a double bond at one end (e.g., the one disclosed in U.S. Pat. No. 4,316,973) (e.g., one represented by the formula (1) in which —$X^1$— is —O— and p is 0).

Maleic anhydride-ene-amino alcohol adduct (Y3): Examples include a product obtained by amino alcohol-mediated imidization of a reaction product obtained by an ene reaction of a polymer of the unsaturated hydrocarbon (x) having a double bond at one end with maleic anhydride (e.g., one represented by the formula (1) in which —$X^1$— is —O— and p is 1).

Hydroformylated-hydrogenated product (Y4): Examples include a product obtained by hydroformylation of a polymer of the unsaturated hydrocarbon (x) having a double bond at one end, followed by hydrogenation (e.g., the one disclosed in JP S63-175096 A) (e.g., one represented by the formula (1) in which —$X^1$— is —O— and p is 0).

In terms of HTHS viscosity and viscosity index improving effect, the polymer (Y) having a hydroxy group at one end is preferably the alkylene oxide adduct (Y1), the hydroborated product (Y2), or the maleic anhydride-ene-amino alcohol adduct (Y3), more preferably the alkylene oxide adduct (Y1).

In the (co)polymer (A), the weight percentage of the monomer (a) among the constituent monomers of the (co)polymer (A) is preferably 1 to 40 wt %, more preferably 5 to 30 wt % based on the total weight of the monomers constituting the (co)polymer (A), in terms of low-temperature viscosity, shear stability, kinematic viscosity at 40° C., HTHS viscosity at 100° C., and viscosity index improving effect.

In the present invention, the (co)polymer (A) may be a copolymer containing, as constituent monomers, a (meth)acrylic acid alkyl ester monomer (b) (hereinafter sometimes abbreviated as the monomer (b)) having a C1-C4 alkyl group and/or a (meth)acryloyl monomer (c) (hereinafter sometimes abbreviated as the monomer (c)) having a C9-C36 straight-chain or branched alkyl group. The monomers (b) and (c) may each include one or more monomers (b) and (c), respectively. Preferably, the (co)polymer (A) is a copolymer containing the monomer (b) as a constituent monomer, in terms of viscosity index improving effect. Preferably, the (co)polymer (A) is a copolymer containing the monomer (c) as a constituent monomer, in terms of solubility in the base oil.

The (meth)acrylic acid alkyl ester monomer (b) having a C1-C4 alkyl group may be an ester of a C1-C4 straight-chain or branched alcohol and (meth)acrylic acid. Examples include methyl (meth)acrylate, ethyl (meth)acrylate, n-propyl (meth)acrylate, isopropyl (meth)acrylate, n-butyl (meth)acrylate, t-butyl (meth)acrylate, s-butyl (meth)acrylate, and isobutyl (meth)acrylate.

In terms of viscosity index improving effect, the monomer (b) is preferably methyl (meth)acrylate, ethyl (meth)acrylate, or n-butyl (meth)acrylate, particularly preferably ethyl (meth)acrylate or n-butyl (meth)acrylate.

The monomer (c) is different from the monomer (a). Examples include a (meth)acryloyl monomer (c1) having a C9-C36 straight-chain alkyl group and a (meth)acryloyl monomer (c2) having a C9-C36 branched alkyl group represented by the following formula (2).

The monomer (c) may include one or more monomers (c).

[Chem. 3]

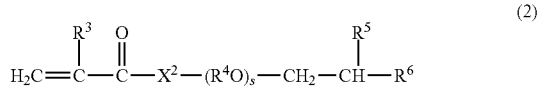

(2)

In the formula (2), $R^3$ is a hydrogen atom or a methyl group; —$X^2$— is a group represented by —O— or —NH—; $R^4O$ is a C2-C4 alkyleneoxy group; $R^5$ and $R^6$ are each independently a C1-C24 straight-chain alkyl group, and the total carbon number of $R^5$ and $R^6$ is 7 to 34; s is an integer of 0 to 20, and each $R^4O$ may be the same or different when s is 2 or more.

Examples of the (meth)acryloyl monomer (c1) (hereinafter sometimes abbreviated as the monomer (c1)) having a C9-C36 straight-chain alkyl group include (meth)acrylic acid alkyl esters {e.g., esters of C9-C36 straight-chain alkyl alcohols and (meth)acrylic acid, such as n-nonyl (meth) acrylate, n-decyl (meth)acrylate, n-undecyl (meth)acrylate, n-dodecyl (meth)acrylate, n-tridecyl (meth)acrylate, n-tetradecyl (meth)acrylate, n-pentadecyl (meth)acrylate, n-hexadecyl (meth)acrylate, n-octadecyl (meth)acrylate, n-icosyl (meth)acrylate, n-tetracosyl (meth)acrylate, n-triacontyl (meth)acrylate, and n-hexatriacontyl (meth)acrylate}; esters of (meth)acrylic acid and an adduct of 1 to 20 moles of an alkylene oxide (C2-C4) to a C9-C36 straight-chain alkyl alcohol; and methacrylic acid alkylamides {e.g., an amide of acrylic acid and a C9-C36 straight-chain alkylamine}.

In terms of viscosity index improving effect, the monomer (c1) is preferably an alkyl (meth)acrylate having a C12-C28 straight-chain alkyl group, more preferably an alkyl (meth) acrylate having a C12-C24 straight-chain alkyl group, particularly preferably an alkyl (meth)acrylate having a C12-C20 straight-chain alkyl group.

The monomer (c1) may include one or more monomers (c1).

In the monomer (c2), $R^3$ in the formula (2) is a hydrogen atom or a methyl group. Of these, a methyl group is preferred in terms of viscosity index improving effect.

—$X^2$— in the formula (2) is a group represented by —O— or —NH—. Of these, a group represented by —O— is preferred in terms of viscosity index improving effect.

$R^4$ in the formula (2) is a C2-C4 alkylene group. Examples of the C2-C4 alkylene group include ethylene, 1,2-or 1,3-propylene, isobutylene, and 1,2-, 1,3-, or 1,4-butylene groups.

$R^4O$ is a C2-C4 alkyleneoxy group. Examples include ethyleneoxy, 1,2- or 1,3-propyleneoxy, isobutyleneoxy, and 1,2-, 1,3-, or 1,4-butyleneoxy groups.

s in the formula (2) is an integer of 0 to 20. In terms of viscosity index improving effect, s is preferably an integer of 0 to 5, more preferably 0 to 2.

When s is 2 or more, each $R^4O$ may be the same or different, and each $R^4O$ in the $(R^4O)_s$ moiety may be bonded in a random form or a block form.

$R^5$ and $R^6$ in the formula (2) are each independently a C1-C24 straight-chain alkyl group. Specific examples include methyl, ethyl, n-propyl, n-butyl, n-heptyl, n-hexyl, n-pentyl, n-octyl, n-nonyl, n-decyl, n-undecyl, n-dodecyl, n-tetradecyl, n-hexadecyl, n-octadecyl, n-eicosyl, and n-tetracosyl groups. In terms of viscosity index improving effect, preferred among the C1-C24 straight-chain alkyl groups are C6-C24 straight-chain alkyl groups, more preferred are C6-C20 straight-chain alkyl groups, particularly preferred are C8-C16 straight-chain alkyl groups.

The total carbon number of $R^5$ and $R^6$ is 7 to 34. In terms of viscosity index improving effect, the total carbon number is preferably 12 to 30, more preferably 14 to 26.

The carbon chain containing $R^5$ and $R^6$ is a C9-C36 branched alkyl group in which one of $R^5$ and $R^6$ is a branched chain.

The carbon number of the branched alkyl group is 9 to 36. In terms of viscosity index improving effect, the carbon number is preferably 14 to 32, more preferably 16 to 28.

Specific examples of the monomer (c2) include 2-octyldecyl (meth)acrylate, esters of (meth)acrylic acid and ethylene glycol mono-2-octylpentadodecyl ether, 2-n-octyldodecyl (meth)acrylate, 2-n-decyltetradecyl (meth)acrylate, 2-n-dodecylhexadecyl (meth)acrylate, 2-n-tetradecyloctadecyl (meth)acrylate, 2-n-dodecylpentadecyl (meth)acrylate, 2-n-tetradecylheptadecyl (meth)acrylate, 2-n-hexadecylheptadecyl (meth)acrylate, 2-n-heptadecylicosyl (meth)acrylate, 2-n-hexadecyldocosyl (meth)acrylate, 2-n-eicosyldocosyl (meth) acrylate, 2-n-tetracosylhexacosyl (meth) acrylate, and N-2-octyldecyl (meth)acrylamide.

The monomer (c2) may include one or more monomers (c2).

In terms of solubility in the base oil and low-temperature viscosity, the monomer (c) is preferably the (meth)acryloyl monomer (c2) having a C9-C36 branched alkyl group represented by the formula (2), more preferably the monomer (c2) that is a (meth)acryloyl monomer having a C14-C32 branched alkyl group, particularly preferably the monomer (c2) that is a (meth)acryloyl monomer having a C16-C28 branched alkyl group.

In the present invention, the (co)polymer (A) may be a copolymer containing a monomer (d) represented by the following formula (3) as a constituent monomer. The monomer (d) may include one or more monomers (d). Preferably, the (co)polymer (A) contains the monomer (d) as a constituent monomer, in terms of viscosity index improving effect and HTHS viscosity reduction.

[Chem. 4]

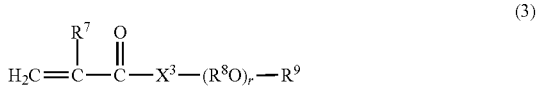

(3)

In the formula (3), $R^7$ is a hydrogen atom or a methyl group; —$X^3$— is a group represented by —O— or —NH—; $R^8$ is a C2-C4 alkylene group; $R^9$ is a C1-C8 alkyl group; r is an integer of 1 to 20, and each $R^8$ may be the same or different when r is 2 or more.

$R^7$ in the formula (3) is a hydrogen atom or a methyl group. Of these, a methyl group is preferred in terms of viscosity index improving effect.

—$X^3$— in the formula (3) is a group represented by —O— or —NH—. Of these, a group represented by —O— is preferred in terms of viscosity index improving effect.

$R^8$ in the formula (3) is a C2-C4 alkylene group.

Examples of the C2-C4 alkylene group include ethylene, 1,2- or 1,3-propylene, isobutylene, and 1,2-, 1,3-, or 1,4-butylene groups.

R⁸O is a C2-C4 alkyleneoxy group. Examples include ethyleneoxy, 1,2- or 1,3-propyleneoxy, isobutyleneoxy, and 1,2-, 1,3-, or 1,4-butyleneoxy groups.

r in the formula (3) is an integer of 1 to 20. In terms of viscosity index improving effect and low-temperature viscosity, preferably, it is an integer of 1 to 5, more preferably 1 to 2.

When r is 2 or more, each R⁸O may be the same or different, and each R⁸O in the (R⁸O)$_r$ moiety may be bonded in a random form or a block form.

R⁹ in the formula (3) is a C1-C8 alkyl group. The C1-C8 alkyl group may be a straight-chain or branched alkyl group. Examples include methyl, ethyl, n-propyl, isopropyl, n-butyl, isobutyl, s-butyl, t-butyl, n-heptyl, isoheptyl, n-hexyl, 2-ethylhexyl, n-pentyl, and n-octyl groups.

In terms of viscosity index improving effect, the C1-C8 alkyl group is preferably a C1-C7 alkyl group, more preferably a C1-C6 alkyl group, particularly preferably a C1-C5 alkyl group, most preferably a C2 or C4 alkyl group.

Specific examples of the monomer (d) include methoxyethyl (meth) acrylate, ethoxyethyl (meth) acrylate, propoxyethyl (meth)acrylate, butoxyethyl (meth)acrylate, pentyloxyethyl (meth) acrylate, hexyloxyethyl (meth) acrylate, heptyloxyethyl (meth) acrylate, octyloxyethyl (meth) acrylate, methoxypropyl (meth) acrylate, ethoxypropyl (meth) acrylate, propoxypropyl (meth) acrylate, butoxypropyl (meth) acrylate, pentyloxypropyl (meth) acrylate, hexyloxypropyl (meth) acrylate, heptyloxypropyl (meth) acrylate, octyloxypropyl (meth) acrylate, methoxybutyl (meth) acrylate, ethoxybutyl (meth) acrylate, propoxybutyl (meth) acrylate, butoxybutyl (meth)acrylate, pentyloxybutyl (meth) acrylate, hexyloxybutyl (meth) acrylate, heptyloxybutyl (meth)acrylate, and octyloxybutyl (meth)acrylate, as well as esters of (meth)acrylic acid and an adduct of 2 to 20 moles of a C2-C4 alkylene oxide (at least one selected from the group consisting of ethylene oxide, propylene oxide, and butylene oxide) to C1-C8 alcohols.

In terms of viscosity index improving effect, the monomer (d) is preferably ethoxyethyl (meth)acrylate or butoxyethyl (meth)acrylate.

In the present invention, the "(meth)acrylate" refers to acrylate and/or methacrylate.

In the (co)polymer (A), the weight percentage of the monomer (b) among the constituent monomers of the (co)polymer (A) is preferably 1 to 80 wt %, more preferably 2 to 70 wt % based on the total weight of the monomers constituting the (co)polymer (A), in terms of viscosity index improving effect.

In the (co)polymer (A), the weight percentage of the monomer (c) among the constituent monomers of the (co)polymer (A) is preferably 1 to 60 wt %, more preferably 5 to 35 wt % based on the total weight of the monomers constituting the (co)polymer (A), in terms of viscosity index improving effect and in order to suitably adjust the SP of the (co)polymer (A).

In the (co)polymer (A), the weight percentage of the monomer (d) among the constituent monomers of the (co)polymer (A) is preferably 2 to 35 wt %, more preferably 5 to 30 wt % based on the total weight of the monomers constituting the (co)polymer (A), in terms of HTHS viscosity at 100° C., kinematic viscosity at 40° C., shear stability, and viscosity index improving effect.

In the (co)polymer (A), the weight ratio (a/d) of the monomer (a) to the monomer (d) among the constituent monomers of the (co)polymer (A) is preferably 95/5 to 1/99, more preferably 90/10 to 5/95, in terms of HTHS viscosity at 100° C., kinematic viscosity at 40° C., and viscosity index improving effect.

The (co)polymer (A) in the present invention may further contain, as constituent monomers, a nitrogen atom-containing monomer (e), a hydroxy group-containing monomer (f), a phosphorus atom-containing monomer (g), an aromatic ring-containing vinyl monomer (h), and monomers (i) to (m), in addition to the monomers (a) to (d).

The monomers (e) to (m) may each include one or more monomers (e) to (m), respectively.

Examples of the nitrogen atom-containing monomer (e) include the following monomers (e1) to (e4), excluding the monomers (a), (c), and (d).

Amide Group-Containing Monomer (e1):

Examples include (meth)acrylamides, monoalkyl (meth)acrylamides (those in which one C1-C4 alkyl group is bonded to a nitrogen atom, such as N-methyl (meth)acrylamide, N-ethyl (meth)acrylamide, N-isopropyl (meth)acrylamide, N-n-butyl (meth)acrylamide, and N-isobutyl (meth)acrylamide), N—(N'-monoalkylaminoalkyl) (meth)acrylamides (those having an aminoalkyl group (C2-C6) in which one C1-C4 alkyl group is bonded to a nitrogen atom, such as N—(N'-methylaminoethyl) (meth)acrylamide, N—(N'-ethylaminoethyl) (meth)acrylamide, N—(N'-isopropylamino-n-butyl) (meth)acrylamide, N—(N'-n-butylamino-n-butyl) (meth)acrylamide, and N—(N'-isobutylamino-n-butyl) (meth)acrylamide); dialkyl (meth)acrylamides (those in which two C1-C4 alkyl groups are bonded to a nitrogen atom, such as N,N-dimethyl (meth)acrylamide, N,N-diethyl (meth)acrylamide, N,N-diisopropyl (meth)acrylamide, and N,N-di-n-butyl (meth)acrylamide); N—(N',N'-dialkylaminoalkyl) (meth)acrylamides (those having an aminoalkyl group (C2-C6) in which two C1-C4 alkyl groups are bonded to a nitrogen atom of an aminoalkyl group, such as N—(N',N'-dimethylaminoethyl) (meth)acrylamide, N—(N',N'-diethylaminoethyl) (meth)acrylamide, N—(N',N'-dimethylaminopropyl) (meth)acrylamide, and N—(N',N'-di-n-butylaminobutyl) (meth)acrylamide); and N-vinyl carboxylic acid amides, such as N-vinylformamide, N-vinylacetamide, N-vinyl-propionic acid amide, and N-vinylhydroxyacetamide.

Nitro Group-Containing Monomer (e2):

Examples include 4-nitrostyrene.

Primary to Tertiary Amino Group-Containing Monomer (e3):

Examples include primary amino group-containing monomers {C3-C6 alkenylamines (e.g., (meth)allylamine and crotylamine) and aminoalkyl (C2-C6) (meth)acrylates (e.g., aminoethyl (meth)acrylate)}; secondary amino group-containing monomers {monoalkylaminoalkyl (meth)acrylates (e.g., those having an aminoalkyl group (C2-C6) in which one C1-C6 alkyl group is bonded to a nitrogen atom, such as N-t-butylaminoethyl (meth)acrylate and N-methylaminoethyl (meth)acrylate), and C6-C12 dialkenylamines (e.g., di(meth)allylamine)}; tertiary amino group-containing monomers {dialkylaminoalkyl (meth)acrylates (e.g., those having an aminoalkyl group (C2-C6) in which two C1-C6 alkyl groups are bonded to a nitrogen atom, such as N,N-dimethylaminoethyl (meth)acrylate and N,N-diethylaminoethyl (meth)acrylate), alicyclic (meth)acrylates having a nitrogen atom such as morpholinoethyl (meth)acrylate, and aromatic monomers such as N—(N',N'-diphenylaminoethyl) (meth) acrylamide, N,N-dimethylaminostyrene, 4-vinylpyridine, 2-vinylpyridine, N-vinylpyrrole, N-vinylpyrrolidone, and N-vinylthiopyrrolidone}; and hydrochlorides, sulfates, phosphates, and lower alkyl (C1-C8) monocarboxylic acid (e.g., acetic acid and propionic acid) salts of these monomers.

Nitrile Group-Containing Monomer (e4):

Examples include (meth) acrylonitrile.

The monomer (e) is preferably the amide group-containing monomer (e1) or the primary to tertiary amino group-containing monomer (e3), more preferably N—(N',N'-diphenylaminoethyl) (meth)acrylamide, N—(N',N'-dimethylaminoethyl) (meth)acrylamide, N—(N',N'-diethylaminoethyl) (meth)acrylamide, N—(N',N'-dimethylaminopropyl) (meth)acrylamide, N,N-dimethylaminoethyl (meth)acrylate, or N,N-diethylaminoethyl (meth)acrylate.

Hydroxy Group-Containing Monomer (f):

Examples include hydroxy group-containing aromatic monomers (e.g., p-hydroxystyrene), hydroxyalkyl (C2-C6) (meth)acrylates (e.g., 2-hydroxyethyl (meth)acrylate and 2-or 3-hydroxypropyl (meth)acrylate), mono- or bis-hydroxyalkyl (C1-C4) substituted (meth)acrylamides (e.g., N,N-bis(hydroxymethyl) (meth)acrylamide, N,N-bis(hydroxypropyl) (meth)acrylamide, and N,N-bis(2-hydroxybutyl) (meth)acrylamide), vinyl alcohol, C3-C12 alkenols (e.g., (meth)allyl alcohol, crotyl alcohol, isocrotyl alcohol, 1-octenol, and 1-undecenol), C4-C12 alkene monools or alkene diols (e.g., 1-buten-3-ol, 2-buten-1-ol, and 2-butene-1,4-diol), hydroxyalkyl (C1-C6) alkenyl (C3-C10) ethers (e.g., 2-hydroxyethylpropenyl ether), and alkenyl (C3-C10) ethers or (meth)acrylates of polyhydric (tri- to octahydric) alcohols (e.g., glycerol, pentaerythritol, sorbitol, sorbitan, diglycerol, sugars, and sucrose) (e.g., (meth)allylether of sucrose).

Examples also include mono(meth)acrylates of polyoxyalkylene glycols (carbon number of the alkylene group: C2-C4; polymerization degree: 2 to 50), polyoxyalkylene polyols (e.g., polyoxyalkylene ethers (carbon number of the alkylene group: C2-C4; polymerization degree: 2 to 100) of the tri- to octahydric alcohols), or alkyl (C1-C4) ethers of polyoxyalkylene glycols or polyoxyalkylene polyols (e.g., polyethylene glycol (Mn: 100 to 300) mono(meth)acrylate, polypropylene glycol (Mn: 130 to 500) mono(meth)acrylate, methoxy polyethylene glycol (Mn: 110 to 310) (meth) acrylate, lauryl alcohol ethylene oxide adduct (2 to 30 moles) (meth)acrylate, and polyoxyethylene (Mn: 150 to 230) sorbitan mono(meth)acrylate).

Examples of the phosphorus atom-containing monomer (g) include the following monomers (g1) and (g2).

Phosphate Ester Group-Containing Monomer (g1):

Examples include (meth)acryloyloxyalkyl (C2-C4) phosphate esters ((meth)acryloyloxyethyl phosphate and (meth) acryloyloxy isopropyl phosphate) and alkenyl phosphate esters (e.g., vinyl phosphate, allyl phosphate, propenyl phosphate, isopropenyl phosphate, butenyl phosphate, pentenyl phosphate, octenyl phosphate, decenyl phosphate, and dodecenyl phosphate). The term "(meth)acryloyloxy" means acryloyloxy or methacryloyloxy.

Phosphono Group-Containing Monomer (g2):

Examples include (meth)acryloyloxy alkyl (C2-C4) phosphonic acids (e.g., (meth)acryloyloxyethyl phosphonic acid) and alkenyl (C2-C12) phosphonic acids (e.g., vinylphosphonic acid, allylphosphonic acid, and octenylphosphonic acid).

The monomer (g) is preferably the phosphate ester group-containing monomer (g1), more preferably a (meth)acryloyloxyalkyl (C2-C4) phosphate ester, particularly preferably (meth)acryloyloxyethyl phosphate.

Aromatic Ring-Containing Vinyl Monomer (h):

Examples include styrene, α-methylstyrene, vinyltoluene, 2,4-dimethylstyrene, 4-ethylstyrene, 4-isopropylstyrene, 4-butylstyrene, 4-phenylstyrene, 4-cyclohexylstyrene, 4-benzylstyrene, 4-crotylbenzene, indene, and 2-vinylnaphthalene.

The monomer (h) is preferably styrene or α-methylstyrene, more preferably styrene.

Examples of the monomer (i) having two or more unsaturated groups include divinylbenzene, C4-C12 alkadienes (e.g., butadiene, isoprene, 1,4-pentadiene, 1,6-heptadiene, and 1,7-octadiene), (di)cyclopentadiene, vinylcyclohexene, ethylidenebicycloheptene, limonene, ethylene di(meth)acrylate, polyalkylene oxide glycol di(meth)acrylate, pentaerythritol triallyl ether, pentaerythritol tri(meth)acrylate, pentaerythritol tetra(meth)acrylate, trimethylolpropane tri (meth)acrylate, and esters disclosed in WO 01/009242 such as an ester of an unsaturated carboxylic acid having a Mn of 500 or more and glycol and an ester of an unsaturated alcohol and a carboxylic acid.

Vinyl Esters, Vinyl Ethers, Vinyl Ketones (j) (Sometimes Abbreviated as the Monomer (j)):

Examples include vinyl esters of C2-C12 saturated fatty acids (e.g., vinyl acetate, vinyl propionate, vinyl butyrate, and vinyl octanoate), C1-C12 alkyl, aryl, or alkoxyalkyl vinyl ethers (e.g., methyl vinyl ether, ethyl vinyl ether, propyl vinyl ether, butyl vinyl ether, 2-ethylhexyl vinyl ether, phenyl vinyl ether, vinyl-2-methoxyethyl ether, and vinyl-2-butoxyethyl ether), and C1-C8 alkyl or aryl vinyl ketones (e.g., methyl vinyl ketone, ethyl vinyl ketone, and phenyl vinyl ketone).

Epoxy Group-Containing Monomer (k) (Sometimes Abbreviated as the Monomer (k)):

Examples include glycidyl (meth)acrylate and glycidyl (meth)allyl ether.

Halogen-Containing Monomer (1) (Sometimes Abbreviated as the Monomer (1)):

Examples include vinyl chloride, vinyl bromide, vinylidene chloride, (meth)allyl chloride, and halogenated styrenes (e.g., dichlorostyrene).

Ester of Unsaturated Polycarboxylic Acid (m) (Sometimes Abbreviated as the Monomer (m)):

Examples include alkyl, cycloalkyl, or aralkyl esters of unsaturated polycarboxylic acids (C1-C8 alkyl diesters (dimethyl maleate, dimethyl fumarate, diethyl maleate, and dioctylmaleate) of unsaturated dicarboxylic acids (e.g., maleic acid, fumaric acid, and itaconic acid)).

In the (co)polymer (A), the weight percentage of the monomer (e) among the constituent monomers of the (co) polymer (A) is preferably 50 wt % or less, more preferably 1 to 40 wt % based on the total weight of the monomers constituting the (co)polymer (A), in terms of HTHS viscosity at an effective temperature and viscosity index improving effect.

In the (co)polymer (A), the weight percentage of the monomer (f) among the constituent monomers of the (co) polymer (A) is preferably 40 wt % or less, more preferably 1 to 30 wt % based on the total weight of the monomers constituting the (co)polymer (A), in terms of HTHS viscosity at an effective temperature and viscosity index improving effect.

In the (co)polymer (A), the weight percentage of the monomer (g) among the constituent monomers of the (co) polymer (A) is preferably 30 wt % or less, more preferably 1 to 20 wt % based on the total weight of the monomers constituting the (co)polymer (A), in terms of HTHS viscosity at an effective temperature and viscosity index improving effect.

In the (co)polymer (A), the weight percentage of the monomer (h) among the constituent monomers of the (co)polymer (A) is preferably 20 wt % or less, more preferably 1 to 15 wt % based on the total weight of the monomers constituting the (co)polymer (A), in terms of HTHS viscosity at an effective temperature and viscosity index improving effect.

In the (co)polymer (A), the weight percentage of the monomer (i) among the constituent monomers of the (co)polymer (A) is preferably 10 wt % or less, more preferably 1 to 5 wt % based on the total weight of the monomers constituting the (co)polymer (A), in terms of HTHS viscosity at an effective temperature.

In the (co)polymer (A), the weight percentage of the monomer (j) among the constituent monomers of the (co)polymer (A) is preferably 5 wt % or less, more preferably 0.5 to 2 wt % based on the total weight of the monomers constituting the (co)polymer (A), in terms of viscosity index improving effect.

In the (co)polymer (A), the weight percentage of the monomer (k) among the constituent monomers of the (co)polymer (A) is preferably 20 wt % or less, more preferably 1 to 10 wt % based on the total weight of the monomers constituting the (co)polymer (A), in terms of viscosity index improving effect.

In the (co)polymer (A), the weight percentage of the monomer (l) among the constituent monomers of the (co)polymer (A) is preferably 5 wt % or less, more preferably 0.1 to 2 wt % based on the total weight of the monomers constituting the (co)polymer (A), in terms of viscosity index improving effect.

In the (co)polymer (A), the weight percentage of the monomer (m) among the constituent monomers of the (co)polymer (A) is preferably 1 wt % or less, more preferably 0.01 to 0.5 wt % based on the total weight of the monomers constituting the (co)polymer (A), in terms of viscosity index improving effect.

The Mw of the (co)polymer (A) is preferably 5,000 to 2,000,000, more preferably 5,000 to 1,000,000, particularly preferably 10,000 to 800,000, most preferably 15,000 to 700,000, most preferably 30,000 to 600,000. When the (co)polymer (A) has a Mw of 5,000 or more, the viscosity temperature characteristic improving effect and the viscosity index improving effect tend to be good. It is also advantageous in terms of cost because the amount of the viscosity-index improving agent is not excessive. When the Mw is 2,000,000 or less, the shear stability tends to be good.

A preferred Mw range of the (co)polymer (A) is different depending on the application of the viscosity-index improving agent and the lubricating oil composition. Table 2 shows preferred ranges.

The Mn of the (co)polymer (A) is preferably 2,500 or more, more preferably 5,000 or more, particularly preferably 7,500 or more, most preferably 15,000 or more. The Mn is also preferably 300,000 or less, more preferably 150,000 or less, particularly preferably 100,000 or less.

When the Mn is 2,500 or more, the viscosity temperature characteristic improving effect and the viscosity index improving effect tend to be good. It is also advantageous in terms of cost because the amount of the viscosity-index improving agent is not excessive. When the Mn is 300,000 or less, the shear stability tends to be good.

The molecular weight distribution (Mw/Mn) of the (co)polymer (A) is preferably 1.0 to 4.0, more preferably 1.5 to 3.5 in terms of shear stability.

Conditions for measuring the Mw, Mn, and molecular weight distribution of the (co)polymer (A) are the same as the conditions for measuring those of the monomer (a).

The (co)polymer (A) can be obtained by a known production method. Specific examples include a method in which one or more of the monomers are solution-polymerized in a solvent in the presence of a polymerization catalyst.

Examples of the solvent include toluene, xylene, C9-C10 alkylbenzenes, methyl ethyl ketone, mineral oils, synthetic oils, and mixtures of these.

Examples of the polymerization catalyst include azo catalysts (e.g., 2,2'-azobis(2-methylbutyronitrile) and 2,2'-azobis(2,4-dimethylvaleronitrile)), peroxide catalysts (e.g., benzoyl peroxide, cumyl peroxide, and lauryl peroxide), and redox catalysts (e.g., mixtures of benzoyl peroxide and tertiary amines).

A known chain transfer agent (e.g., C2-C20 alkylmercaptans) can also be used in order to further adjust the molecular weight, if necessary.

The polymerization temperature is preferably 25° C. to 140° C., more preferably 50° C. to 120° C. The (co)polymer (A) can also be obtained by bulk polymerization, emulsion polymerization, or suspension polymerization other than the solution polymerization.

The polymerization form of the (co)polymer (A) may be a random addition polymer, an alternating copolymer, a graft copolymer, or a block copolymer.

In terms of solubility in the base oil, the SP calculated based on weight fractions of the monomers constituting the (co)polymer (A) is preferably 8.0 to 10.0 $(cal/cm^3)^{1/2}$, more preferably 8.5 to 9.5 $(cal/cm^3)^{1/2}$.

The SP calculated based on weight fractions of the monomers constituting the (co)polymer (A) (sometimes abbreviated as the SP of the (co)polymer (A)) means a value obtained by calculating the SPs of the structural units (structures in which vinyl groups are polymerization reacted to form a single bond) derived from the monomers constituting the (co)polymer (A) using the SP calculation method described above, and calculating a weighted arithmetic mean based on weight fractions of the constituent monomers at the time of preparation. For example, when the monomer is methyl methacrylate, since a structural unit derived from

TABLE 2

| Application | More preferably | Still more preferably | Particularly preferably |
|---|---|---|---|
| Engine oil | 150,000 to 1,000,000 | 230,000 to 1,000,000 | 300,000 to 800,000 |
| ATF* | 5,000 to 150,000 | 10,000 to 80,000 | 12,000 to 55,000 |
| Belt-CVTF** | | | (most preferably 15,000 to |
| Gear oil, MFT*** | | | 50,000) |
| Traction fluids | 10,000 to 600,000 | 12,000 to 230,000 | 15,000 to 150,000 |

*Automatic transmission fluid
**Belt-continuously variable transmission fluid
***Manual transmission fluid methyl methacrylate contains two $CH_3$ atoms, one $CH_2$ atom, one C atom, and one $CO_2$ atom in the atomic group, the SP of the structural unit derived from methyl methacrylate is determined to be 9.933 $(cal/cm^3)^{1/2}$. The SP of a structural unit derived from ethyl methacrylate is determined to be 9.721 $(cal/cm^3)^{1/2}$ by a similar calculation.

$\Sigma \Delta e_i = 1125 \times 2 + 1180 + 350 + 4300 = 8080$ $\Sigma \Delta v_i = 33.5 \times 2 + 16.1 - 19.2 + 18.0 = 81.9$ $\delta = (8080/81.9)^{1/2} = 9.933$ $(cal/cm^3)^{1/2}$ When the copolymer is a polymer of 50 wt % methyl methacrylate and 50 wt % ethyl methacrylate, the SP of the copolymer is determined by calculating a weighted arithmetic mean of the SPs of the monomer-derived structural units based on weight fractions as described below.

SP of copolymer=$(9.933 \times 50 + 9.721 \times 50)/100 = 9.827$

The SP calculated based on weight fractions of the monomers constituting the (co)polymer (A) can be adjusted to a desired range by appropriately selecting the monomers to be used and adjusting the weight fractions of the monomers to be used. Specifically, use of many monomers having a high-carbon number alkyl group can result in a lower SP, and use of many monomers having a low-carbon number alkyl group can result in a higher SP.

In terms of useful life of the lubricating oil composition, the shear stability index (SSI) of the (co)polymer (A) is preferably 70 or less, more preferably 60 or less.

In the present invention, the SSI of the (co)polymer (A) indicates the percentage of reduction in viscosity by shearing of the (co)polymer (A). It is a value measured according to ASTM D6278. More specifically, it is a value calculated by the following formula (3).

$$SSI = (Kv_0 - Kv_1)/(Kv_0 - Kv_{oil}) \quad (3)$$

In the formula (3), $Kv_0$ indicates a value of kinematic viscosity at 100° C. of a sample oil obtained by diluting a viscosity-index improving agent containing the (co)polymer (A) in a mineral oil; and $Kv_1$ is a value of kinematic viscosity at 100° C. of the sample oil obtained by diluting the viscosity-index improving agent containing the (co)polymer (A) in a mineral oil after the sample oil has passed through a high-shear Bosch diesel injector for 30 cycles according to the procedures of ASTM D6278. $Kv_{oil}$ indicates a value of kinematic viscosity at 100° C. of the mineral oil used for dilution of the viscosity-index improving agent.

The viscosity-index improving agent of the present invention may further contain a (meth)acrylic acid alkyl ester (co)polymer (C) different from the (co)polymer (A), in addition to the (co)polymer (A). The presence of the (co)polymer (C) is preferred in terms of low-temperature viscosity.

The (co)polymer (C) may be a (co)polymer not containing the monomer (a). Examples include a (co)polymer containing, as a constituent monomer, the (meth)acryloyl monomer (c) having a C9-C36 straight-chain and/or branched alkyl group. Specific examples of include a n-dodecyl (meth)acrylate/n-tetradecyl (meth)acrylate/n-hexadecyl (meth)acrylate/n-octadecyl (meth)acrylate copolymer, a n-octadecyl (meth)acrylate/n-dodecyl (meth)acrylate (molar ratio of 10-30/90-70) copolymer, a n-tetradecyl (meth)acrylate/n-dodecyl (meth)acrylate (molar ratio: 10-30/90-70) copolymer, a n-hexadecyl (meth)acrylate/n-dodecyl (meth)acrylate/methyl (meth)acrylate (molar ratio: 20-40/55-75/0-10) copolymer, and a n-dodecyl acrylate/n-dodecyl methacrylate (molar ratio: 10-40/90-60) copolymer. These may be used alone or in combination of two or more.

In terms of low-temperature viscosity, the amount of the (co)polymer (C) in the viscosity-index improving agent of the present invention is preferably 0.01 to 30 wt %, more preferably 0.01 to 10 wt % based on the weight of the (co)polymer (A).

In terms of lower pour point temperature, the Mw of the (co)polymer (C) is preferably 5,000 to 100,000, more preferably 10,000 to 80,000.

In terms of solubility in the base oil, the SP calculated based on weight fractions of the monomers constituting the (co)polymer (C) is preferably 7.0 to 10, more preferably 8.0 to 9.5.

Conditions for measuring the Mw of the (co)polymer (C) are the same as the conditions for measuring the Mw of the monomer (a), and the method of calculating the SP of the (co)polymer (C) is the same as the method of calculating the SP of the (co)polymer (A).

Preferably, the viscosity-index improving agent of the present invention contains the (co)polymer (A) in an amount of 10 wt % or more and 40 wt % or less based on the weight of the viscosity-index improving agent.

Preferably, the viscosity-index improving agent of the present invention contains the (co)polymer (C) in an amount of 0.01 to 5 wt % based on the weight of the viscosity-index improving agent.

<Ester Oil>

The viscosity-index improving agent of the present invention contains the (co)polymer (A), an ester oil (B1) having a kinematic viscosity at 100° C. as measured according to JIS-K2283 (hereinafter abbreviated as kinematic viscosity at 100° C.) of 1.00 to 2.50 $mm^2/s$, and an ester oil (B2) having a kinematic viscosity at 100° C. of 2.51 to 5.00 $mm^2/s$. The viscosity-index improving agent of the present invention contains the ester oil (B1) or the ester oil (B2). Thus, even when the copolymer (A) having a high molecular weight is present at a high concentration, the resulting viscosity-index improving agent tends to have a low viscosity and a good handleability, and such a viscosity-index improving agent can be easily taken out from a reactor after production. Further, the ester oil (B1) and the ester oil (B2) used in combination produces an effect of imparting excellent friction characteristics to a lubricating oil composition when added thereto. Presumably, an excellent friction reduction effect can be exerted as a result of adsorption of the ester oil (B1) onto a metal surface and an increase in oil film thickness by extended polymer chains due to interaction between the (co)polymer (A) and the ester oil (B2).

The kinematic viscosity at 100° C. can be adjusted by changing the carbon number of a carboxylic acid and an alcohol during synthesis of the ester oi. For example, use of one having a higher carbon number increases the kinematic viscosity at 100° C. and use of one having a lower carbon number decreases the kinematic viscosity at 100° C.

Examples of the ester oil (B1) include monoesters of C14-C18 straight-chain or branched saturated or unsaturated aliphatic monocarboxylic acids and C1-C8 straight-chain or branched saturated or unsaturated aliphatic monohydric alcohols, having a total carbon number of 16 to 22 {e.g., ethyl myristate, propyl myristate, butyl myristate, octyl myristate, ethyl myristoleate, propyl myristoleate, butyl myristoleate, octyl myristoleate, methyl palmitate, ethyl palmitate, propyl palmitate, butyl palmitate, methyl palmitoleate, ethyl palmitoleate, propyl palmitoleate, butyl palmitoleate, methyl stearate, ethyl stearate, propyl stearate, butyl stearate, methyl oleate (kinematic viscosity at 100° C.: 1.62 mm²/s), ethyl oleate (kinematic viscosity at 100° C.: 1.83 mm²/s), propyl oleate (kinematic viscosity at 100° C.: 2.01 mm²/s), and butyl oleate (kinematic viscosity at 100° C.: 2.20 mm²/s) }, diesters of C6-C10 straight-chain saturated alkyl dicarboxylic acids and C4-C8 saturated or unsaturated aliphatic monohydric alcohols, having a total carbon number of 14 to 22 {e.g., di(n-butyl) sebacate (kinematic viscosity at 100° C.: 2.04 mm²/s), di(n-butyl) adipate (kinematic viscosity at 100° C.: 1.40 mm²/s), and bis(2-ethylhexyl) adipate (kinematic viscosity at 100° C.: 2.32 mm²/s)}.

Preferred of these in terms of HTHS viscosity, kinematic viscosity at 40° C., evaporability at 250° C., and friction characteristics are propyl oleate, butyl oleate, di(n-butyl) sebacate, and bis(2-ethylhexyl) adipate. More preferred are butyl oleate and bis(2-ethylhexyl) adipate.

Examples of the ester oil (B2) include monoesters of C16-C18 straight-chain or branched saturated or unsaturated aliphatic monocarboxylic acids and C8-C10 straight-chain or branched saturated or unsaturated aliphatic monools, having a total carbon number of 24 to 28 {e.g., octyl palmitate, decyl palmitate, octyl palmitoleate, decyl palmitoleate, octyl stearate, decyl stearate, octyl oleate (kinematic viscosity at 100° C.: 2.60 mm²/s), and decyl oleate}, and diesters of C6-C12 straight-chain saturated alkyl dicarboxylic acids and C4-C10 saturated or unsaturated aliphatic monohydric alcohols, having a total carbon number of 23 to 30 {e.g., di(n-octyl) sebacate (kinematic viscosity at 100° C.: 3.21 mm²/s), diisononyl adipate (kinematic viscosity at 100° C.: 3.05 mm²/s), diisodecyl adipate (kinematic viscosity at 100° C.: 3.62 mm²/s), diisodecyl sebacate (kinematic viscosity at 100° C.: 4.73 mm²/s), bis(2-ethylhexyl) sebacate (kinematic viscosity at 100° C.: 3.20 mm²/s), and bis(2-ethylhexyl) dodecanedioate (kinematic viscosity at 100° C.: 3.80 mm²/s)}.

Preferred of these in terms of HTHS viscosity, kinematic viscosity at 40° C., evaporability at 250° C., and friction characteristics are diisononyl adipate, di(n-octyl) sebacate, diisodecyl adipate, diisodecyl sebacate, bis(2-ethylhexyl) sebacate, and bis(2-ethylhexyl) dodecanedioate. More preferred are di(n-octyl) sebacate and diisodecyl adipate.

In terms of HTHS viscosity, kinematic viscosity at 40° C., evaporability at 250° C., and friction characteristics, the kinematic viscosity at 100° C. of the ester oil (B1) is preferably 2.00 to 2.40 mm²/s.

In terms of HTHS viscosity, kinematic viscosity at 40° C., evaporability at 250° C., and friction characteristics, the kinematic viscosity at 100° C. of the ester oil (B2) is preferably 3.00 to 3.90 mm²/s.

In terms of evaporability at 250° C. and friction reduction effect, the difference ((B2)–(B1)) in kinematic viscosity at 100° C. between the ester oil (B1) and the ester oil (B2) is preferably 0.8 to 1.5 mm²/s.

The kinematic viscosity at 100° C. of the ester oil (B1) and the ester oil (B2) in the viscosity-index improving agent can be measured according to the following method.

The composition of each ester oil in the viscosity-index improving agent can be identified by, for example, NMR analysis and/or mass spectrometry of the viscosity-index improving agent from which the polymer was separated. The kinematic viscosity at 100° C. of an ester oil containing the same components as those of each ester oil whose presence in the viscosity-index improving agent has been identified is measured according to JIS-K2283, whereby the kinematic viscosity at 100° C. of each ester oil in the viscosity-index improving agent can be measured.

In terms of viscosity index, the viscosity index of the ester oil (B1) is preferably 100 or more, more preferably 105 to 230.

In terms of viscosity index, the viscosity index of the ester oil (B2) is preferably 100 or more, more preferably 105 to 190.

The viscosity index of the ester oil (B1) and the ester oil (B2) (as measured according to JIS-K2283) can be adjusted by changing the carbon number of a carboxylic acid and an alkyl alcohol during synthesis of the ester oil. Specifically, use of one having a higher carbon number tends to increase the viscosity index.

In terms of solubility of various additives, the SP of the ester oil (B1) is preferably 8.0 to 10.0 $(cal/cm^3)^{1/2}$, more preferably 8.5 to 9.5 $(cal/cm^3)^{1/2}$.

In terms of solubility of various additives, the SP of the ester oil (B2) is preferably 8.0 to 10.0 $(cal/cm^3)^{1/2}$, more preferably 8.5 to 9.5 $(cal/cm^3)^{1/2}$.

In terms of HTHS viscosity, kinematic viscosity at 40° C., and evaporability at 250° C., the absolute difference between the SP of the ester oil (B1) and the SP of the ester oil (B2) is preferably 0.01 to 2.0 $(cal/cm^3)^{1/2}$, more preferably 0.01 to 1.5 $(cal/cm^3)^{1/2}$, particularly preferably 0.01 to 1.0 $(cal/cm^3)^{1/2}$.

The absolute difference between the SP as calculated based on weight fractions of the monomers constituting the (co)polymer (A) and the SP of the ester oil {weight average of (B1) and (B2)} is preferably 0.1 to 2.0 $(cal/cm^3)^{1/2}$, more preferably 0.1 to 1.5 $(cal/cm^3)^{1/2}$, particularly preferably 0.1 to 1.0 $(cal/cm^3)^{1/2}$.

In terms of friction characteristics, HTHS viscosity at 100° C., kinematic viscosity at 40° C., and evaporability at 250° C., the weight ratio {(B1)/(B2)} of the ester oil (B1) to the ester oil (B2) in the viscosity-index improving agent of the present invention is preferably 10/90 to 90/10, more preferably 20/80 to 80/20.

With this range, a lubricating oil composition containing the viscosity-index improving agent has a weight ratio of the ester oil (B1) to the ester oil (B2) in the above range. Such a lubricating oil composition tends to have good friction characteristics, a good HTHS viscosity at 100° C., a good kinematic viscosity at 40° C., and a good evaporability at 250° C. In particular, the range tends to contribute to further improvement in friction characteristics and evaporability at 250° C.

In terms of handleability, HTHS viscosity at 100° C., kinematic viscosity at 40° C., and evaporability at 250° C. of the viscosity-index improving agent, the weight ratio ({(A)/(B1)+(B2))} of the (co)polymer (A) to the total of the ester oil (B1) and the ester oil (B2) in the viscosity-index improving agent of the present invention is preferably 10/90 to 50/50, more preferably 20/80 to 35/65.

With this range, the resulting viscosity-index improving agent tends to have a low viscosity (e.g., low viscosity at 90° C.) and a good handleability. When the viscosity-index improving agent is used to produce a lubricating oil composition, the weight ratio of the (co)polymer (A) to the total of the ester oil (B1) and the ester oil (B2) in the lubricating oil composition is in the above range, and the lubricating oil composition tends to have a good HTHS viscosity at 100° C., a good kinematic viscosity at 40° C., and a good evaporability at 250° C.

In terms of handleability, HTHS viscosity at 100° C., kinematic viscosity at 40° C., and evaporability at 250° C. of the viscosity-index improving agent, the total amount of the ester oil (B1) and the ester oil (B2) in the viscosity-index improving agent of the present invention is preferably 30 to 90 wt %, more preferably 40 to 85 wt %, particularly preferably 45 to 83 wt % based on the weight of the viscosity-index improving agent.

In terms of handleability, HTHS viscosity at 100° C., kinematic viscosity at 40° C., and evaporability at 250° C. of the viscosity-index improving agent, the amount of the (co)polymer (A) in the viscosity-index improving agent of the present invention is preferably 10 to 70 wt %, more preferably 10 to 40 wt %, particularly preferably 13 to 40 wt % based on the weight of the viscosity-index improving agent.

The viscosity-index improving agent of the present invention may further contain a base oil different from the ester oil (B1) and the ester oil (B2).

Examples of the base oil different from the ester oil (B1) and the ester oil (B2) include an ester oil having a kinematic viscosity at 100° C. of less than 1.00 mm$^2$/s, an ester oil having a kinematic viscosity at 100° C. of more than 5.00 mm$^2$/s, and a hydrocarbon oil. The hydrocarbon oil is preferred in terms of oxidative stability.

Examples of the hydrocarbon oil include hydrocarbon oils of API Groups I to IV.

In terms of solubility of various additives, the SP of the hydrocarbon oil is preferably 7.8 to 9.5 (cal/cm$^3$)$^{2/2}$, more preferably 8.0 to 9.0 (cal/cm$^3$)$^{1/2}$.

In the case of using a mixture of multiple hydrocarbon compounds as a hydrocarbon oil (e.g., a mineral oil), approximate constituent components and molecular structure thereof can be determined by molecular weight measurement by GPC and molecular structure analysis by $^1$H-NMR, $^{13}$C-NMR, and the like. The SP of the hydrocarbon oil can be determined by calculating a weighted arithmetic mean based on molar fractions.

In the viscosity-index improving agent of the present invention, the absolute difference between the SP of the ester oil {weight average of (B1) and (B2)} and the SP of the hydrocarbon oil is preferably 0.1 to 2.0 (cal/cm$^3$)$^{1/2}$, more preferably 0.2 to 1.5 (cal/cm$^3$)$^{1/2}$, particularly preferably 0.3 to 1.0 (cal/cm$^3$)$^{1/2}$, in terms of compatibility.

In the viscosity-index improving agent of the present invention, the absolute difference between the SP as calculated based on weight fractions of the monomers constituting the (co)polymer (A) and the SP of the hydrocarbon oil is preferably 0.8 to 2.0 (cal/cm$^3$)$^{1/2}$, more preferably 0.8 to 1.3 (cal/cm$^3$)$^{1/2}$, particularly preferably 0.9 to 1.2 (cal/cm$^3$)$^{1/2}$, in terms of compatibility.

The absolute difference between the SP as calculated based on weight fractions of the monomers constituting the (co)polymer (A) and the SP of the hydrocarbon oil can be adjusted to a desired range by appropriately adjusting the SP of monomers for use in production of the (co)polymer (A) and weight fractions of these monomers.

In terms of viscosity index and low-temperature fluidity, the kinematic viscosity at 100° C. of the hydrocarbon oil (as measured according to JIS-K2283) is preferably 1 to 15 mm$^2$/s, more preferably 2 to 5 mm$^2$/s.

In terms of viscosity index and low-temperature fluidity of the lubricating oil composition, the viscosity index of the hydrocarbon oil (as measured according to JIS-K2283) is preferably 100 or more.

In terms of oxidative stability of the viscosity-index improving agent as well as HTHS viscosity, kinematic viscosity at 40° C., and low-temperature viscosity of the lubricating oil composition, the weight ratio ({(B1)+(B2)}/hydrocarbon oil) of the total weight of the ester oil (B1) and the ester oil (B2) to the weight of the hydrocarbon oil in the viscosity-index improving agent is preferably 100/0 to 10/90, more preferably 99.9/0.1 to 20/80.

In terms of HTHS viscosity, the weight ratio ((A)/hydrocarbon oil) of the (co)polymer (A) to the hydrocarbon oil in the viscosity-index improving agent is preferably 100/0 to 50/50, more preferably 90/10 to 80/20.

In terms of oxidative stability, HTHS viscosity at 100° C., kinematic viscosity at 40° C., and low-temperature viscosity of the viscosity-index improving agent, the amount of the hydrocarbon oil in the viscosity-index improving agent of the present invention is preferably 1 to 60 wt %, more preferably 2 to 30 wt % based on the weight of the viscosity-index improving agent.

The kinematic viscosity at 90° C. of the viscosity-index improving agent (as measured according to JIS-K2283) is preferably 100 to 20000 mm$^2$/s, more preferably 300 to 12000 mm$^2$/s, in terms of handleability of the viscosity-index improving agent.

The cloud point of the hydrocarbon oil (as measured according to JIS K 2269) is preferably −5° C. or lower, more preferably −15° C. or lower. When the cloud point of the hydrocarbon oil is in this range, the lubricating oil composition tends to have a good low-temperature viscosity.

<Lubricating Oil Composition>

The lubricating oil composition of the present invention contains the viscosity-index improving agent of the present invention and at least one additive selected from the group consisting of a detergent, a dispersant, an antioxidant, an oiliness improver, a pour point depressant, a friction and wear modifier, an extreme pressure agent, a defoamer, a demulsifier, a metal deactivator, and a corrosion inhibitor.

In terms of low fuel consumption, preferably, the lubricating oil composition of the present invention contains the (co)polymer (A) in an amount of 0.1 wt % or more and less than 10 wt %, more preferably 0.5 wt % or more and less than 10 wt % based on the weight of the lubricating oil composition.

In terms of low-temperature viscosity, preferably, the lubricating oil composition of the present invention contains the (co)polymer (C) in an amount of 0.01 to 2 wt % based on the weight of the lubricating oil composition.

In terms of low-temperature viscosity, the amount of the (co)polymer (C) in the lubricating oil composition of the present invention is preferably 0.01 to 30 wt %, more preferably 0.01 to 10 wt % based on the weight of the (co)polymer (A).

In terms of low-temperature viscosity, HTHS viscosity at 100° C., and kinematic viscosity at 40° C., preferably, the lubricating oil composition of the present invention contains the ester oil (B1) and the ester oil (B2) in a total amount of 1 to 99.9 wt %, more preferably 2 to 30 wt % based on the weight of the lubricating oil composition.

In terms of oxidative stability, preferably, the lubricating oil composition of the present invention contains a hydrocarbon oil in an amount of 98.9 wt % or less, more preferably 50 to 90 wt % based on the weight of the lubricating oil composition.

The lubricating oil composition used as an engine oil is preferably a base oil having a kinematic viscosity at 100° C. of 2 to 10 mm$^2$/s (a mixture of the ester oil (B1), the ester oil (B2), and optionally a hydrocarbon oil) containing the (co)polymer (A) in an amount of 1 wt % or more and less than 10 wt %.

The lubricating oil composition used as a gear oil is preferably a base oil having a kinematic viscosity at 100° C. of 2 to 10 mm$^2$/s (a mixture of the ester oil (B1), the ester oil (B2), and optionally a hydrocarbon oil) containing the (co)polymer (A) in an amount of 3 to 20 wt %.

The lubricating oil composition used as an automatic transmission oil (e.g., ATF or belt-CVTF) is preferably a base oil having a kinematic viscosity at 100° C. of 2 to 6 mm²/s (a mixture of the ester oil (B1), the ester oil (B2), and optionally a hydrocarbon oil) containing the (co)polymer (A) in an amount of 3 to 20 wt %.

The lubricating oil composition used as a traction oil is preferably a base oil having a kinematic viscosity at 100° C. of 1 to 5 mm²/s (a mixture of the ester oil (B1), the ester oil (B2), and optionally a hydrocarbon oil) containing the (co)polymer (A) in an amount of 0.5 to 10 wt %.

In terms of friction characteristics, HTHS viscosity at 100° C., kinematic viscosity at 40° C., and evaporability at 250° C., the weight ratio {(B1)/(B2)} of the ester oil (B1) to the ester oil (B2) in the lubricating oil composition of the present invention is preferably 10/90 to 90/10, more preferably 20/80 to 80/20.

In terms of low-temperature viscosity, HTHS viscosity at 100° C. and kinematic viscosity at 40° C., the weight ratio ((A)/{(B1)+(B2)}) of the weight of the (co)polymer (A) to the total weight of the ester oil (B1) and the ester oil (B2) in the lubricating oil composition of the present invention is preferably 10/90 to 50/50, more preferably 20/80 to 35/65.

In terms of oxidative stability, low-temperature viscosity, HTHS viscosity at 100° C., kinematic viscosity at 40° C., and evaporability at 250° C. of the viscosity-index improving agent, the weight ratio ({(B1)+(B2)/hydrocarbon oil) of the total weight of the ester oil (B1) and the ester oil (B2) to the weight of the hydrocarbon oil in the lubricating oil composition is preferably 1/99 to 20/80, more preferably 2/98 to 15/85.

In terms of HTHS viscosity, the weight ratio ((A)/hydrocarbon oil) of the (co)polymer (A) to the hydrocarbon oil in the lubricating oil composition is preferably 0.1/99.9 to 20/80, more preferably 1/99 to 10/90.

The lubricating oil composition of the present invention contains various additives. Examples of the additives include the followings.

(1) Detergent:
Examples include basic, overbased, or neutral metal salts (e.g., overbased metal salts or alkaline earth metal salts of sulfonates such as petroleum sulfonate, alkylbenzene sulfonate, and alkylnaphthalene sulfonate), salicylates, phenates, naphthenates, carbonates, phosphonates, and mixtures of detergents.

(2) Dispersant:
Examples include succinimides (bis- or mono-polybutenyl succinimides), Mannich condensates, and borates.

(3) Antioxidant:
Examples include hindered phenols and aromatic secondary amines.

(4) Oiliness Improver:
Examples include long-chain fatty acids and their esters (e.g., oleic acid and its ester), long-chain amines and their amides (e.g., oleylamine and oleylamide).

(5) Pour Point Depressant:
Examples include polyalkylmethacrylates and ethylene-vinyl acetate copolymers.

(6) Friction and Wear Modifier:
Examples include molybdenum-based compounds and zinc-based compounds (e.g., molybdenum dithiophosphate, molybdenum dithiocarbamate, and zinc dialkyldithiophosphate).

(7) Extreme Pressure Agent:
Examples include sulfur-based compounds (mono- or disulfide, sulfoxide, and sulfur phosphide compounds), phosphide compounds, and chlorinated compounds (e.g., chlorinated paraffin).

(8) Defoamer:
Examples include silicone oils, metallic soap, fatty acid esters, and phosphate compounds.

(9) Demulsifier:
Examples include quaternary ammonium salts (e.g., tetraalkyl ammonium salt), sulfonated oil and phosphates (e.g., phosphates of polyoxyethylene-containing nonionic surfactant), and hydrocarbon-based solvents (toluene, xylene, and ethyl benzene).

(10) Metal Deactivator
Examples include nitrogen atom-containing compounds (e.g., benzotriazole), nitrogen atom-containing chelate compounds (e.g., N,N'-disalicylidene-1,2-diaminopropane), and nitrogen/sulfur atom-containing compounds (e.g., 2-(n-dodecylthio)benzimidazole).

(11) Corrosion Inhibitor:
Examples include nitrogen-containing compounds (e.g., benzotriazole and 1,3,4-thiadiazolyl-2,5-bisdialkyldithio-carbamate).

Only one of these additives may be added, or two or more additives may be added if necessary. A mixture of these additives may be referred to as a performance additive or a package additive, and such a mixture may be added.

The amount of each of these additives is preferably 0.1 to 15% by weight based on the total amount of the lubricating oil composition. The total amount of these additives is preferably 0.1 to 30% by weight, more preferably 0.3 to 20% by weight based on the total amount of the lubricating oil composition.

The lubricating oil composition of the present invention is suitably used for gear oils (e.g., differential oil and industrial gear oil), MTF, transmission fluids (e.g., ATF, DCTF, and belt-CVTF), traction fluids (e.g., toroidal-CVTF), shock absorber fluids, power steering fluids, hydraulic oils (e.g., construction machinery hydraulic oil and industrial hydraulic oil), and engine oils (e.g., gasoline engine and diesel engine).

EXAMPLES

The present invention is described in further detail below with reference to examples and comparative examples, but the present invention is not limited to these examples.

The proportion of the 1,2-butylene in the structural units of the hydrocarbon polymer was determined by analyzing the polymer by $^{13}$C-NMR and calculating using the formula (1) according to the above method.

The molar ratio of a 1,2-adduct to a 1,4-adduct (molar ratio in a structure derived from butadiene) in the hydrocarbon polymer was determined by analyzing the polymer by $^{13}$C-NMR and substituting the integral value B and the integral value C used in the formula (1) into the following formula (3).

Molar ratio of 1,2-adduct/1,4-adduct={100×integral value $B$×4/integral value $C$}/{100−(100×integral value $B$×4/integral value $C$)}   (3)

Production Example 1

A 1-L SUS pressure-resistant reaction vessel equipped with a temperature adjuster and a stirrer was charged with degassed and dehydrated hexane (400 parts by weight), tetrahydrofuran (0.5 part by weight), 1,3-butadiene (90 parts by weight), and n-butyllithium (0.9 parts by weight), followed by polymerization at a polymerization temperature of 50° C.

After the polymerization proceeded to almost 100%, ethylene oxide (2 parts by weight) was added. The mixture was reacted at 50° C. for additional three hours. To terminate the reaction, water (50 parts by weight) and a 1 N aqueous hydrochloric acid solution (25 parts by weight) were added to the mixture, followed by stirring at 80° C. for one hour. The organic phase of the reaction solution was collected in a separating funnel, and heated to 70° C. Then, the solvent was removed under reduced pressure of 0.027 to 0.040 MPa over two hours.

The resulting polybutadiene having a hydroxy group at one end was transferred to a reaction vessel equipped with a temperature adjuster, a stirrer, and a hydrogen inlet tube, and tetrahydrofuran (150 parts by weight) was added and uniformly dissolved therein. To the resulting solution was added a suspension obtained in advance by mixing palladium on carbon (10 parts by weight) and tetrahydrofuran (50 parts by weight). Then, the mixture was reacted at room temperature for eight hours while hydrogen was supplied at a flow rate of 30 mL/min through the hydrogen inlet tube into the solution. Subsequently, the palladium on carbon was filtered out. The resulting filtrate was heated to 70° C., and tetrahydrofuran was removed under reduced pressure of 0.027 to 0.040 MPa. Thus, a hydrogenated polybutadiene polymer having a hydroxy group at one end (Y-1) was obtained.

The molecular weight of the resulting (Y-1) was measured by GPC, and the proportion of the 1,2-butylene group was measured by 13C-NMR. The results were as follows: Mw=7,000; Mn=6,500; proportion of the 1,2-butylene group=45 mol %; and molar ratio (1,2-adduct/1,4-adduct)=45/55.

Production Example 2

A 1-L SUS pressure-resistant reaction vessel equipped with a temperature adjuster and a stirrer was charged with degassed and dehydrated hexane (400 parts by weight), tetrahydrofuran (2 parts by weight), 1,3-butadiene (90 parts by weight), and n-butyllithium (0.9 parts by weight), followed by polymerization at a polymerization temperature of minus 0° C.

After the polymerization proceeded to almost 100%, ethylene oxide (2 parts by weight) was added, and the mixture was reacted at 50° C. for three hours. To terminate the reaction, water (50 parts by weight) and a 1 N aqueous hydrochloric acid solution (25 parts by weight) were added to the mixture, followed by stirring at 80° C. for one hour. The organic phase of the reaction solution was collected in a separating funnel, and heated to 70° C. Then, the solvent was removed under reduced pressure of 0.027 to 0.040 MPa over two hours.

The resulting polybutadiene having a hydroxy group at one end was transferred to a reaction vessel equipped with a temperature adjuster, a stirrer, and a hydrogen inlet tube, and tetrahydrofuran (150 parts by weight) was added and uniformly dissolved therein. To the resulting solution was added a suspension obtained in advance by mixing palladium on carbon (10 parts by weight) and tetrahydrofuran (50 parts by weight). Then, the mixture was reacted at room temperature for eight hours while hydrogen was supplied at a flow rate of 30 mL/min through the hydrogen inlet tube into the solution. Subsequently, the palladium on carbon was filtered out. The resulting filtrate was heated to 70° C., and tetrahydrofuran was removed under reduced pressure of 0.027 to 0.040 MPa. Thus, a hydrogenated polybutadiene polymer having a hydroxy group at one end (Y-2) was obtained.

The molecular weight of the resulting (Y-2) was measured by GPC, and the proportion of the 1,2-butylene group was measured by $^{13}$C-NMR. The results were as follows: Mw=7,000; Mn=6,500; proportion of the 1,2-butylene group=65 mol %; and molar ratio (1,2-adduct/1,4-adduct)=65/35.

Production Example 3: Production of Copolymer (C)

A reaction vessel equipped with a stirrer, a heating and cooling device, a thermometer, a dropping funnel, a nitrogen inlet tube, and a decompressor was charged with a hydrocarbon oil (kinematic viscosity at 100° C.: 4.2 mm$^2$/s; viscosity index: 128) (75 parts by weight). Separately, a glass beaker was charged with n-dodecyl methacrylate (244 parts by weight), n-tetradecyl methacrylate (24 parts by weight), n-hexadecyl methacrylate (41 parts by weight), n-octadecyl methacrylate (16 parts by weight), dodecylmercaptan as a chain transfer agent (0.6 parts by weight), 2,2-azobis(2,4-dimethylvaleronitrile) (0.5 parts by weight), and 2,2-azobis(2-methylbutyronitrile) (0.2 parts by weight), followed by stirring at 20° C. and mixing to prepare a monomer solution, which was then introduced into the dropping funnel.

After purging the gas phase in the reaction vessel with nitrogen (gas phase oxygen concentration: 100 ppm or less), the monomer solution was added dropwise over two hours with the temperature in the system maintained at 70° C. to 85° C. under hermetically sealed conditions. The mixture was aged at 85° C. for two hours after completion of the dropwise addition. Subsequently, after heating to 120° C. to 130° C., unreacted monomers were removed at the same temperature under reduced pressure (0.027 to 0.040 MPa) over two hours. Thus, a copolymer composition (C-1) containing a copolymer (C) in an amount of 65 wt % in the base oil was separately obtained. The resulting copolymer (C) had a Mw of 53,000 and a SP of 9.0.

Examples 1 to 24, Comparative Examples 1 to 3

A reaction vessel equipped with a stirrer, a heating and cooling device, a thermometer, and a nitrogen inlet tube was charged with a base oil formulation, a monomer formulation, and a catalyst of types and amounts described in Table 3-1, Table 3-2, or Table 4. After purging with nitrogen (gas phase oxygen concentration: 100 ppm), the mixture was heated to 76° C. with stirring under hermetically sealed conditions and polymerized at the same temperature for four hours. After heating to 120° C. to 130° C., unreacted monomers were removed at the same temperature under reduced pressure (0.027 to 0.040 MPa) over two hours. Further, the copolymer composition (C-1) obtained in Production Example 3 was added in an amount described in Table 3-1, Table 3-2, or Table 4, and the SP of each of the copolymers (A-1) to (A-10) in the viscosity-index improving agents (R-1) to (R-24) and (R'-1) to (R'-3) were calculated by the above method, and the Mw and Mn thereof were calculated by the above method. In addition, the solubility of the copolymer (A) in the base oil was evaluated according to the following method. Further, the oxidative stability of the viscosity-index improving agent was evaluated according to the following method. Further, the kinematic viscosity of the viscosity-index improving agent was evaluated according to the following method. Table 3-1, Table 3-2, and Table 4 show the results.

<Method of Evaluating Solubility of Copolymer (A) in Base Oil>

The appearance of each of the viscosity-index improving agents (R-1) to (R-24) and (R'-1) to (R'-3) kept at a temperature of 25° C. for one day was visually observed under fluorescent white light at room temperature of 25° C., and the solubility of the copolymer (A) in the base oil was evaluated according to the following evaluation criteria.

[Evaluation Criteria]

Good: The appearance is uniform without insoluble fractions of the copolymer.

Poor: The appearance is non-uniform, and insoluble fractions of the copolymer are observed.

<Method of Measuring Oxidative Stability>

According to JIS-K2514, an oxidative stability test was performed at 165.5° C.±0.5° C. for 120 hours, and the amount of increase (mgKOH/g) in total acid value of the viscosity-index improving agent and the lubricating oil composition before and after the test was measured. A lower value indicates a better oxidative stability.

[Evaluation Criteria: Viscosity-Index Improving Agent]

Excellent: The amount of increase in total acid value of the lubricating oil composition before and after the test is not more than 30 mgKOH/g.

Good: The amount of increase in total acid value of the lubricating oil composition before and after the test is more than 30 mgKOH/g and not more than 50 mgKOH/g.

Fair: The amount of increase in total acid value of the lubricating oil composition before and after the test is more than 50 mgKOH/g and not more than 70 mgKOH/g.

<Method of Measuring Kinematic Viscosity of Viscosity-Index Improving Agent>

The kinematic viscosity at 90° C. was measured according to the method described in JIS-K2283. A lower value indicates a lower viscosity and a better handleability.

TABLE 3-1

| | | | | | | | Example | | | | | |
|---|---|---|---|---|---|---|---|---|---|---|---|---|
| | | | 1 | 2 | 3 | 4 | 5 | 6 | 7 | 8 | 9 |
| Viscosity-index improving agent | | | R-1 | R-2 | R-3 | R-4 | R-5 | R-6 | R-7 | R-8 | R-9 |
| Copolymer | | | A-1 | A-1 | A-1 | A-1 | A-1 | A-1 | A-1 | A-1 | A-1 |
| Monomer formulation for producing copolymer (A) (wt %) | Monomer (a) | (a-1) | 7.5 | 7.5 | 7.5 | 7.5 | 7.5 | 7.5 | 7.5 | 7.5 | 7.5 |
| | | (a-2) | 7.5 | 7.5 | 7.5 | 7.5 | 7.5 | 7.5 | 7.5 | 7.5 | 7.5 |
| | Monomer (b) | (b-1) | — | — | — | — | — | — | — | — | — |
| | | (b-2) | 60 | 60 | 60 | 60 | 60 | 60 | 60 | 60 | 60 |
| | | (b-3) | — | — | — | — | — | — | — | — | — |
| | | (b-4) | — | — | — | — | — | — | — | — | — |
| | Monomer (c) | (c-1) | 10 | 10 | 10 | 10 | 10 | 10 | 10 | 10 | 10 |
| | | (c-2) | 5 | 5 | 5 | 5 | 5 | 5 | 5 | 5 | 5 |
| | Monomer (d) | (d-1) | 10 | 10 | 10 | 10 | 10 | 10 | 10 | 10 | 10 |
| | Total | | 0 | 100 | 100 | 100 | 100 | 100 | 100 | 100 | 100 |
| Monomer formulation (parts by weight) | | | 200 | 150 | 100 | 75 | 150 | 150 | 150 | 150 | 150 |
| Base oil formulation (parts by weight) | | | 292 | 342 | 392 | 417 | 345 | 345 | 345 | 345 | 345 |
| Catalyst (parts by weight) | 2,2'-Azobis (2-methylbutyronitrile) | | 0.13 | 0.13 | 0.13 | 0.13 | 0.13 | 0.13 | 0.13 | 0.13 | 0.13 |
| Copolymer composition (C-1) (parts by weight) | | | 8 | 8 | 8 | 8 | 8 | 8 | 8 | 8 | 8 |
| Amount in viscosity-index improving agent (wt %) | Copolymer (A) | | 40.00 | 30.00 | 20.00 | 15.00 | 30.00 | 30.00 | 30.00 | 30.00 | 30.00 |
| | Copolymer (C) | | 1.00 | 1.00 | 1.00 | 1.00 | 1.00 | 1.00 | 1.00 | 1.00 | 1.00 |
| | Ester oil (B1) | Ester oil 1 (B1) | 26.55 | 32.29 | 38.00 | 40.91 | 54.86 | 48.44 | 16.15 | 9.73 | 23.05 |
| | | Ester oil 3 (B1) | — | — | — | — | — | — | — | — | — |
| | Ester oil (B2) | Ester oil 2 (B2) | 26.55 | 32.29 | 38.00 | 40.91 | 9.73 | 16.15 | 48.44 | 54.86 | 22.98 |
| | | Ester oil 4 (B2) | — | — | — | — | — | — | — | — | — |
| | Hydrocarbon oil | Hydrocarbon oil 1 | 5.90 | 4.42 | 3.00 | 2.18 | 4.42 | 4.42 | 4.42 | 4.42 | 22.98 |
| | | Hydrocarbon oil 2 | — | — | — | — | — | — | — | — | — |
| Solubility of copolymer (A) in base oil | | | Good | Good | Good | Good | Good | Good | Good | Good | Good |
| Oxidative stability | | | Excellent | Excellent | Good | Fair | Excellent | Excellent | Excellent | Excellent | Excellent |
| Kinematic viscosity at 90° C. of viscosity-index improving agent (mm$^2$/s) | | | 12000 | 3200 | 500 | 300 | 2600 | 2700 | 3100 | 3000 | 3200 |
| SP of copolymer (A) | | | 9.20 | 9.20 | 9.20 | 9.20 | 9.20 | 9.20 | 9.20 | 9.20 | 9.20 |
| Mw (×10$^4$) of copolymer (A) | | | 50 | 50 | 50 | 50 | 50 | 50 | 50 | 50 | 50 |
| Mw/Mn of copolymer (A) | | | 2.90 | 2.90 | 2.90 | 2.90 | 2.90 | 2.90 | 2.90 | 2.90 | 2.90 |
| Weight ratio ((B1)/(B2)) | | | 50/50 | 50/50 | 50/50 | 50/50 | 85/15 | 75/25 | 25/75 | 15/85 | 50/50 |
| Weight ratio ((A)/((B1) + (B2))) | | | 43/57 | 32/68 | 21/79 | 15/85 | 32/68 | 32/68 | 32/68 | 32/68 | 39/61 |
| Weight ratio (((B1) + (B2))/Hydrocarbon oil) | | | 90/10 | 94/6 | 96/4 | 97/3 | 94/6 | 94/6 | 94/6 | 94/6 | 67/33 |
| Weight ratio ((A)/Hydrocarbon oil) | | | 87/13 | 87/13 | 87/13 | 87/13 | 87/13 | 87/13 | 87/13 | 87/13 | 57/43 |
| Weight ratio (a/d) | | | 60/40 | 60/40 | 60/40 | 60/40 | 60/40 | 60/40 | 60/40 | 60/40 | 60/40 |

TABLE 3-2

|  |  |  | Example | | | | | | | | |
|---|---|---|---|---|---|---|---|---|---|---|---|
|  |  |  | 10 | 11 | 12 | 13 | 14 | 15 | 16 | 17 | 18 |
| Viscosity-index improving agent | | | R-10 | R-11 | R-12 | R-13 | R-14 | R-15 | R-16 | R-17 | R-18 |
| Copolymer | | | A-1 | A-1 | A-1 | A-2 | A-3 | A-4 | A-5 | A-5 | A-5 |
| Monomer formulation for producing copolymer (A) (wt %) | Monomer (a) | (a-1) | 7.5 | 7.5 | 7.5 | 4 | 6 | 10 | 7.5 | 7.5 | 7.5 |
| | | (a-2) | 7.5 | 7.5 | 7.5 | 4 | 6 | 10 | 7.5 | 7.5 | 7.5 |
| | Monomer (b) | (b-1) | — | — | — | — | — | — | — | — | — |
| | | (b-2) | 60 | 60 | 60 | 60 | 60 | 60 | 63 | 63 | 63 |
| | | (b-3) | — | — | — | — | — | — | — | — | — |
| | | (b-4) | — | — | — | — | — | — | — | — | — |
| | Monomer (c) | (c-1) | 10 | 10 | 10 | 10 | 10 | 10 | 6 | 6 | 6 |
| | | (c-2) | 5 | 5 | 5 | 5 | 5 | 5 | — | — | — |
| | Monomer (d) | (d-1) | 10 | 10 | 10 | 17 | 13 | 5 | 16 | 16 | 16 |
| | Total | | 100 | 100 | 100 | 100 | 100 | 100 | 100 | 100 | 100 |
| Monomer formulation (parts by weight) | | | 150 | 150 | 150 | 150 | 150 | 150 | 125 | 125 | 125 |
| Base oil formulation (parts by weight) | | | 342 | 342 | 350 | 342 | 342 | 342 | 367 | 367 | 367 |
| Catalyst (parts by weight) | 2,2'-Azobis (2-methylbutyronitrile) | | 0.13 | 0.13 | 0.13 | 0.15 | 0.08 | 0.16 | 0.31 | 0.32 | 0.31 |
| Copolymer composition (C-1) (parts by weight) | | | 8 | 8 | 0 | 8 | 8 | 8 | 8 | 8 | 8 |
| Amount in viscosity-index improving agent (wt %) | Copolymer (A) | | 30.00 | 30.00 | 30.00 | 30.00 | 30.00 | 30.00 | 25.00 | 25.00 | 25.00 |
| | Copolymer (C) | | 1.00 | 1.00 | 0.00 | 1.00 | 1.00 | 1.00 | 1.00 | 1.00 | 1.00 |
| | Ester oil (B1) | Ester oil 1 (B1) | 29.07 | 34.50 | 32.80 | 31.50 | 31.50 | 31.50 | 27.80 | — | 35.20 |
| | | Ester oil 3 (B1) | — | — | — | — | — | — | — | 35.20 | — |
| | Ester oil (B2) | Ester oil 2 (B2) | 29.07 | 34.50 | 32.80 | 31.50 | 31.50 | 31.50 | 27.80 | 35.20 | — |
| | | Ester oil 4 (B2) | — | — | — | — | — | — | — | — | 35.20 |
| | Hydrocarbon oil | Hydrocarbon oil 1 | 10.26 | 0.54 | 4.40 | 6.00 | 6.00 | 6.00 | 9.20 | 3.60 | 3.60 |
| | | Hydrocarbon oil 2 | — | — | — | — | — | — | 9.20 | — | — |
| Solubility of copolymer (A) in base oil | | | Good | Good | Good | Good | Good | Good | Good | Good | Good |
| Oxidative stability | | | Excellent | Fair | Excellent | Excellent | Excellent | Excellent | Excellent | Excellent | Excellent |
| Kinematic viscosity at 90° C. of viscosity-index improving agent (mm²/s) | | | 2700 | 2400 | 2600 | 2400 | 2800 | 1800 | 700 | 800 | 1200 |
| SP of copolymer (A) | | | 9.20 | 9.20 | 9.20 | 9.28 | 9.24 | 9.15 | 9.25 | 9.25 | 9.25 |
| Mw (×10⁴) of copolymer (A) | | | 50 | 50 | 50 | 48 | 55 | 47 | 30 | 28 | 29 |
| Mw/Mn of copolymer (A) | | | 2.90 | 2.90 | 2.90 | 2.85 | 3.00 | 2.75 | 2.70 | 2.70 | 2.70 |
| Weight ratio ((B1)/(B2)) | | | 50/50 | 50/50 | 50/50 | 50/50 | 50/50 | 50/50 | 50/50 | 50/50 | 50/50 |
| Weight ratio ((A)/((B1) + (B2))) | | | 34/66 | 30/70 | 31/69 | 32/68 | 32/68 | 32/68 | 31/69 | 26/74 | 26/74 |
| Weight ratio (((B1) + (B2))/Hydrocarbon oil) | | | 86/14 | 100/0 | 94/6 | 91/9 | 91/9 | 91/9 | 75/25 | 95/5 | 95/5 |
| Weight ratio ((A)/Hydrocarbon oil) | | | 75/25 | 100/0 | 87/13 | 84/16 | 84/16 | 84/16 | 58/42 | 87/13 | 87/13 |
| Weight ratio (a/d) | | | 60/40 | 60/40 | 60/40 | 32/68 | 48/52 | 80/20 | 48/52 | 48/52 | 48/52 |

TABLE 4

|  |  |  | Example | | | | | | Comparative Example | | |
|---|---|---|---|---|---|---|---|---|---|---|---|
|  |  |  | 19 | 20 | 21 | 22 | 23 | 24 | 1 | 2 | 3 |
| Viscosity-index improving agent | | | R-19 | R-20 | R-21 | R-22 | R-23 | R-24 | R'-1 | R'-2 | R'-3 |
| Copolymer | | | A-6 | A-6 | A-7 | A-8 | A-9 | A-10 | A-1 | A-1 | A-1 |
| Monomer formulation for producing copolymer (A) (wt %) | Monomer (a) | (a-1) | 6 | 6 | 7.5 | 15 | 7.5 | 7.5 | 7.5 | 7.5 | 7.5 |
| | | (a-2) | 6 | 6 | 7.5 | — | 7.5 | 7.5 | 7.5 | 7.5 | 7.5 |
| | Monomer (b) | (b-1) | 21 | 21 | 10 | — | — | — | — | — | — |
| | | (b-2) | 42 | 42 | 60 | 60 | 50 | 50 | 60 | 60 | 60 |
| | | (b-3) | — | — | — | — | 10 | — | — | — | — |
| | | (b-4) | — | — | — | — | — | 10 | — | — | — |
| | Monomer (c) | (c-1) | 10 | 10 | 10 | 10 | 10 | 10 | 10 | 10 | 10 |
| | | (c-2) | — | — | 5 | 5 | 5 | 5 | 5 | 5 | 5 |
| | Monomer (d) | (d-1) | 15 | 15 | — | 10 | 10 | 10 | 10 | 10 | 10 |
| | Total | | 100 | 100 | 100 | 100 | 100 | 100 | 100 | 100 | 100 |
| Monomer formulation (parts by weight) | | | 125 | 90 | 150 | 150 | 150 | 150 | 150 | 150 | 150 |

TABLE 4-continued

|  |  |  | Example |  |  |  |  |  | Comparative Example |  |  |
|---|---|---|---|---|---|---|---|---|---|---|---|
|  |  |  | 19 | 20 | 21 | 22 | 23 | 24 | 1 | 2 | 3 |
| Base oil formulation (parts by weight) | | | 367 | 402 | 342 | 342 | 342 | 342 | 342 | 342 | 342 |
| Catalyst 2,2'-Azobis (parts by (2-methylbutyronitrile) weight) | | | 0.32 | 0.06 | 0.13 | 0.13 | 0.13 | 0.13 | 0.13 | 0.13 | 0.13 |
| Copolymer composition (C-1) (parts by weight) | | | 8 | 8 | 8 | 8 | 8 | 8 | 8 | 8 | 8 |
| Amount in viscosity-index improving agent (wt %) | Copolymer (A) | | 25.00 | 18.00 | 30.00 | 30.00 | 30.00 | 30.00 | 30.00 | 30.00 | 30.00 |
|  | Copolymer (C) | | 1.00 | 1.00 | 1.00 | 1.00 | 1.00 | 1.00 | 1.00 | 1.00 | 1.00 |
|  | Ester oil (B1) | Ester oil 1 (B1) | 48.30 | 44.20 | 32.30 | 32.30 | 32.29 | 32.29 | 64.60 | — | — |
|  |  | Ester oil 3 (B1) | — | — | — | — | — | — | — | — | — |
|  | Ester oil (B2) | Ester oil 2 (B2) | 22.70 | 34.70 | 32.30 | 32.30 | 32.29 | 32.29 | — | 64.60 | — |
|  |  | Ester oil 4 (B2) | — | — | — | — | — | — | — | — | — |
|  | Hydrocarbon oil | Hydrocarbon oil 1 | 3.00 | 2.10 | 4.40 | 4.40 | 4.42 | 4.42 | 4.40 | 4.40 | 69.00 |
|  |  | Hydrocarbon oil 2 | — | — | — | — | — | — | — | — | — |
| Solubility of copolymer (A) in base oil | | | Good | Good | Good | Good | Good | Good | Good | Good | Good |
| Oxidative stability | | | Excellent | Fair | Excellent | Excellent | Excellent | Excellent | Fair | Excellent | Excellent |
| Kinematic viscosity at 90° C. of viscosity-index improving agent (mm²/s) | | | 700 | 600 | 2800 | 2900 | 3000 | 3000 | 2800 | 3000 | 50000 |
| SP of copolymer (A) | | | 9.32 | 9.32 | 9.23 | 9.20 | 9.19 | 9.19 | 9.20 | 9.20 | 9.20 |
| Mw (×10⁴) of copolymer (A) | | | 28 | 70 | 50 | 50 | 50 | 50 | 50 | 50 | 50 |
| Mw/Mn of copolymer (A) | | | 2.65 | 3.15 | 2.90 | 2.90 | 2.90 | 2.90 | 2.90 | 2.90 | 2.90 |
| Weight ratio ((B1)/(B2)) | | | 68/32 | 56/44 | 50/50 | 50/50 | 50/50 | 50/50 | 100/0 | 0/100 | — |
| Weight ratio ((A)/((B1) + (B2))) | | | 26/74 | 19/81 | 32/68 | 32/68 | 32/68 | 32/68 | 32/68 | 32/68 | — |
| Weight ratio (((B1) + (B2))/Hydrocarbon oil) | | | 96/4 | 97/3 | 94/6 | 94/6 | 94/6 | 94/6 | 94/6 | 94/6 | 0/100 |
| Weight ratio ((A)/Hydrocarbon oil) | | | 89/11 | 90/10 | 87/13 | 87/13 | 87/13 | 87/13 | 87/13 | 87/13 | 30/70 |
| Weight ratio (a/d) | | | 44/56 | 44/56 | — | 60/40 | 60/40 | 60/40 | 60/40 | 60/40 | 60/40 |

The base oils and the monomers (a) to (d) described in Table 3-1, Table 3-2, and Table 4 are as follows.

Ester oil 1: bis(2-ethylhexyl) adipate (SP: 8.93 $(cal/cm^3)^{1/2}$; kinematic viscosity at 100° C.: 2.32 mm²/s; viscosity index: 118)

Ester oil 2: bis(2-ethylhexyl) sebacate (SP: 8.87 $(cal/cm^3)^{1/2}$; kinematic viscosity at 100° C.: 3.20 mm²/s; viscosity index: 151)

Ester oil 3: butyl oleate (SP: 8.62 $(cal/cm^3)^{1/2}$; kinematic viscosity at 100° C.: 2.20 mm²/s; viscosity index: 232)

Ester oil 4: diisodecyl adipate (SP: 8.97 $(cal/cm^3)^{1/2}$, kinematic viscosity at 100° C.: 3.62 mm²/s; viscosity index: 141)

Hydrocarbon oil 1: kinematic viscosity at 100° C.: 4.2 mm²/s; viscosity index: 122

Hydrocarbon oil 2: kinematic viscosity at 100° C.: 3.1 mm²/s; viscosity index: 106

(Y-1): Hydride of polybutadiene having a hydroxy group at one end (proportion of 1,2-butylene group=45 mol %) obtained in Production Example 1

(Y-2): Hydride of polybutadiene having a hydroxy group at one end (proportion of 1,2-butylene group=65 mol %) obtained in Production Example 2

(a-1): Methacrylic acid ester [Mn: 6,600] of (Y-1)

(a-2): Methacrylic acid ester [Mn: 6,600] of (Y-2)

(b-1): Ethyl methacrylate (b-2): n-Butyl methacrylate (b-3): Isopropyl methacrylate (b-4): Isobutyl methacrylate (c-1): C12-C15 straight-chain and branched alkyl methacrylate mixture (ester of methacrylic acid and Neodol23 (available from Shell Chemicals))

(c-2): C14-C16 straight-chain and branched alkyl methacrylate mixture (ester of methacrylic acid and Neodol45 (available from Shell Chemicals))

(d-1): Butoxy ethyl methacrylate

Examples 25 to 48 and Comparative Examples 4 to 6: Evaluation of OW-20

A stainless steel vessel equipped with a stirrer was charged with a hydrocarbon oil (SP: 8.3 to 8.4 $(cal/cm^3)^{1/2}$; kinematic viscosity at 100° C.: 4.2 mm²/s; viscosity index: 128) (90 parts by weight) and a package additive "Infineum P5741" (base number: 84 mgKOH/g; calcium content: 2.49%; nitrogen content: 0.68%; phosphorus content: 0.78%; sulfated ash: 9.76%, zinc content: 0.86%) (10 parts by weight) to obtain lubricating oil compositions. Then, the viscosity-index improving agents (R-1) to (R-24) and (R'-1) to (R'-3) were added to the respective lubricating oil compositions such that each lubricating oil composition has a HTHS viscosity at 150° C. of 2.60±0.05 (mPa·s). Thus, lubricating oil compositions (V-1) to (V-24) and (W-1) to (W-3) were obtained.

The following properties of the lubricating oil compositions (V-1) to (V-24) and (W-1) to (W-3) were measured according to the following methods: shear stability (BOSCH SSI, Sonic SSI); HTHS viscosity (150° C., 100° C., 80° C.); kinematic viscosity (100° C., 40° C.); viscosity index; low-temperature viscosity (−40° C.); evaporability at 250° C.; and friction characteristics. Table 5 and Table 6 show the results.

TABLE 5

| | | Example | | | | | | |
|---|---|---|---|---|---|---|---|---|
| | | 25 | 26 | 27 | 28 | 29 | 30 | 31 |
| Lubricating oil composition | | V-1 | V-2 | V-3 | V-4 | V-5 | V-6 | V-7 |
| Viscosity-index improving agent | | R-1 | R-2 | R-3 | R-4 | R-5 | R-6 | R-7 |
| Amount of copolymer (A) in lubricating oil composition (wt %) | | 2.20 | 2.20 | 2.20 | 2.20 | 2.40 | 2.30 | 2.20 |
| Amount of ester oil (B1) in lubricating oil composition (wt %) | | 1.40 | 2.40 | 4.20 | 6.10 | 4.30 | 3.70 | 1.20 |
| Amount of ester oil (B2) in lubricating oil composition (wt %) | | 1.40 | 2.40 | 4.20 | 6.10 | 0.80 | 1.20 | 3.40 |
| Amount of copolymer (C) in lubricating oil composition (wt %) | | 0.06 | 0.07 | 0.11 | 0.15 | 0.08 | 0.08 | 0.07 |
| Amount of hydrocarbon oil in lubricating oil composition (wt %) | | 86.04 | 84.03 | 80.39 | 76.55 | 83.52 | 83.82 | 84.23 |
| Amount of additives in lubricating oil composition (wt %) | | 8.90 | 8.90 | 8.90 | 8.90 | 8.90 | 8.90 | 8.90 |
| Evaluation results | HTHS viscosity (150° C.) (mPa·s) | 2.6 | 2.6 | 2.6 | 2.6 | 2.6 | 2.6 | 2.6 |
| | HTHS viscosity (100° C.) (mPa·s) | 4.60 | 4.56 | 4.54 | 4.50 | 4.54 | 4.54 | 4.56 |
| | HTHS viscosity (80° C.) (mPa·s) | 6.75 | 6.72 | 6.69 | 6.66 | 6.69 | 6.69 | 6.72 |
| | Kinematic vicsosity at 100° C. (mm$^2$/s) | 7.35 | 7.32 | 7.30 | 7.21 | 7.32 | 7.29 | 7.30 |
| | Kinematic vicsosity at 40° C. (mm$^2$/s) | 26.50 | 26.40 | 26.33 | 26.24 | 26.33 | 26.35 | 26.42 |
| | Viscosity index | 267 | 267 | 266 | 262 | 267 | 265 | 265 |
| | BOSCH SSI (%) | 3 | 3 | 3 | 3 | 3.5 | 3.5 | 3 |
| | Sonic SSI (%) | 30 | 30 | 30 | 30 | 31 | 31 | 30 |
| | Low-temperature viscosity (−40° C.) (mPa·s) | 19,000 | 17,000 | 16,000 | 16,000 | 16,000 | 16,500 | 17,000 |
| | Evaporability at 250° C. (%) | 12.5 | 13.1 | 13.7 | 14.2 | 13.5 | 13.7 | 13.2 |
| | Friction coefficient | 0.114 | 0.113 | 0.114 | 0.112 | 0.122 | 0.117 | 0.118 |

| | | Example | | | | | |
|---|---|---|---|---|---|---|---|
| | | 32 | 33 | 34 | 35 | 36 | 37 |
| Lubricating oil composition | | V-8 | V-9 | V-10 | V-11 | V-12 | V-13 |
| Viscosity-index improving agent | | R-8 | R-9 | R-10 | R-11 | R-12 | R-13 |
| Amount of copolymer (A) in lubricating oil composition (wt %) | | 2.10 | 2.00 | 2.10 | 2.20 | 2.20 | 2.40 |
| Amount of ester oil (B1) in lubricating oil composition (wt %) | | 0.70 | 1.50 | 2.10 | 2.50 | 2.50 | 2.50 |
| Amount of ester oil (B2) in lubricating oil composition (wt %) | | 3.80 | 1.50 | 2.10 | 2.50 | 2.50 | 2.50 |
| Amount of copolymer (C) in lubricating oil composition (wt %) | | 0.07 | 0.07 | 0.07 | 0.07 | 0.00 | 0.08 |
| Amount of hydrocarbon oil in lubricating oil composition (wt %) | | 84.43 | 86.03 | 84.73 | 83.83 | 83.90 | 83.62 |
| Amount of additives in lubricating oil composition (wt %) | | 8.90 | 8.90 | 8.90 | 8.90 | 8.90 | 8.90 |
| Evaluation results | HTHS viscosity (150° C.) (mPa·s) | 2.6 | 2.6 | 2.6 | 2.6 | 2.6 | 2.6 |
| | HTHS viscosity (100° C.) (mPa·s) | 4.56 | 4.60 | 4.57 | 4.52 | 4.56 | 4.58 |
| | HTHS viscosity (80° C.) (mPa·s) | 6.72 | 6.75 | 6.71 | 6.68 | 6.72 | 6.75 |
| | Kinematic vicsosity at 100° C. (mm$^2$/s) | 7.33 | 7.38 | 7.25 | 7.22 | 7.33 | 6.95 |
| | Kinematic vicsosity at 40° C. (mm$^2$/s) | 26.49 | 26.54 | 26.44 | 26.28 | 26.40 | 26.44 |

TABLE 5-continued

|  | | | | | | |
|---|---|---|---|---|---|---|
| Viscosity index | 266 | 268 | 262 | 262 | 267 | 244 |
| BOSCH SSI (%) | 3 | 3 | 3 | 3 | 3 | 2 |
| Sonic SSI (%) | 30 | 30 | 30 | 30 | 30 | 26 |
| Low-temperature viscosity (−40° C.) (mPa · s) | 17,500 | 19,500 | 17,000 | 15,500 | 19,500 | 16,500 |
| Evaporability at 250° C. (%) | 13.0 | 12.8 | 13.3 | 13.2 | 13.0 | 13.2 |
| Friction coefficient | 0.123 | 0.114 | 0.114 | 0.113 | 0.114 | 0.113 |

TABLE 6

|  |  | Example | | | | | | |
|---|---|---|---|---|---|---|---|---|
|  |  | 38 | 39 | 40 | 41 | 42 | 43 | 44 |
| Lubricating oil composition | | V-14 | V-15 | V-16 | V-17 | V-18 | V-19 | V-20 |
| Viscosity-index improving agent | | R-14 | R-15 | R-16 | R-17 | R-18 | R-19 | R-20 |
| Amount of copolymer (A) in lubricating oil composition (wt %) | | 2.10 | 2.00 | 2.20 | 2.30 | 2.20 | 2.60 | 1.90 |
| Amount of ester oil (B1) in lubricating oil composition (wt %) | | 2.20 | 2.00 | 2.50 | 3.20 | 3.10 | 5.10 | 4.70 |
| Amount of ester oil (B2) in lubricating oil composition (wt %) | | 2.20 | 2.00 | 2.50 | 3.20 | 3.10 | 2.40 | 3.70 |
| Amount of copolymer (C) in lubricating oil composition (wt %) | | 0.07 | 0.07 | 0.09 | 0.09 | 0.09 | 0.11 | 0.11 |
| Amount of hydrocarbon oil in lubricating oil composition (wt %) | | 84.53 | 85.03 | 83.81 | 82.31 | 82.61 | 80.89 | 80.69 |
| Amount of additives in lubricating oil composition (wt %) | | 8.90 | 8.90 | 8.90 | 8.90 | 8.90 | 8.90 | 8.90 |
| Evaluation results | HTHS viscosity (150° C.) (mPa · s) | 2.6 | 2.6 | 2.6 | 2.6 | 2.6 | 2.6 | 2.6 |
|  | HTHS viscosity (100° C.) (mPa · s) | 4.53 | 4.61 | 4.58 | 4.49 | 4.55 | 4.54 | 4.42 |
|  | HTHS viscosity (80° C.) (mPa · s) | 6.68 | 6.77 | 6.74 | 6.65 | 6.69 | 6.66 | 6.64 |
|  | Kinematic vicsosity at 100° C. (mm$^2$/s) | 7.38 | 7.25 | 6.94 | 6.90 | 6.92 | 6.90 | 7.19 |
|  | Kinematic vicsosity at 40° C. (mm$^2$/s) | 26.26 | 26.59 | 26.46 | 26.20 | 26.41 | 26.49 | 26.44 |
|  | Viscosity index | 272 | 260 | 244 | 244 | 243 | 241 | 258 |
|  | BOSCH SSI (%) | 4 | 2 | 1 | 1 | 1 | 1 | 5 |
|  | Sonic SSI (%) | 32 | 26 | 20 | 17 | 20 | 17 | 37 |
|  | Low-temperature viscosity (−40° C.) (mPa · s) | 16,500 | 16,000 | 16,000 | 17,000 | 16,000 | 14,000 | 15,500 |
|  | Evaporability at 250° C. (%) | 13.2 | 13.1 | 12.9 | 13.0 | 13.1 | 13.7 | 13.6 |
|  | Friction coefficient | 0.112 | 0.113 | 0.113 | 0.114 | 0.115 | 0.112 | 0.113 |

|  | Example | | | | Comparative Example | | |
|---|---|---|---|---|---|---|---|
|  | 45 | 46 | 47 | 48 | 4 | 5 | 6 |
| Lubricating oil composition | V-21 | V-22 | V-23 | V-24 | W-1 | W-2 | W-3 |
| Viscosity-index improving agent | R-21 | R-22 | R-23 | R-24 | R'-1 | R'-2 | R'-3 |
| Amount of copolymer (A) in lubricating oil composition (wt %) | 2.20 | 2.20 | 2.20 | 2.20 | 2.30 | 2.10 | 2.20 |
| Amount of ester oil (B1) in lubricating oil composition (wt %) | 2.40 | 2.40 | 2.40 | 2.40 | 5.00 | 0.00 | 0.00 |
| Amount of ester oil (B2) in lubricating oil composition (wt %) | 2.40 | 2.40 | 2.40 | 2.40 | 0.00 | 4.50 | 0.00 |
| Amount of copolymer (C) in lubricating oil composition (wt %) | 0.07 | 0.07 | 0.07 | 0.07 | 0.08 | 0.07 | 0.07 |

TABLE 6-continued

|  |  |  |  |  |  |  |  |
|---|---|---|---|---|---|---|---|
| Amount of hydrocarbon oil in lubricating oil composition (wt %) | | 84.03 | 84.03 | 84.03 | 84.03 | 83.72 | 84.43 | 88.83 |
| Amount of additives in lubricating oil composition (wt %) | | 8.90 | 8.90 | 8.90 | 8.90 | 8.90 | 8.90 | 8.90 |
| Evaluation results | HTHS viscosity (150° C.) (mPa·s) | 2.6 | 2.6 | 2.6 | 2.6 | 2.6 | 2.6 | 2.6 |
| | HTHS viscosity (100° C.) (mPa·s) | 4.55 | 4.56 | 4.57 | 4.57 | 4.55 | 4.58 | 4.62 |
| | HTHS viscosity (80° C.) (mPa·s) | 6.69 | 6.73 | 6.73 | 6.73 | 6.70 | 6.74 | 6.94 |
| | Kinematic vicsosity at 100° C. (mm²/s) | 7.20 | 7.35 | 7.33 | 7.33 | 7.31 | 7.40 | 7.30 |
| | Kinematic vicsosity at 40° C. (mm²/s) | 26.48 | 26.45 | 26.42 | 26.42 | 26.38 | 26.55 | 27.35 |
| | Viscosity index | 258 | 268 | 267 | 267 | 266 | 269 | 253 |
| | BOSCH SSI (%) | 3 | 3 | 3 | 3 | 3 | 3 | 3 |
| | Sonic SSI (%) | 30 | 30 | 30 | 30 | 30 | 30 | 31 |
| | Low-temperature viscosity (−40° C.) (mPa·s) | 16,000 | 19,000 | 17,000 | 17,000 | 16,500 | 17,000 | 23,000 |
| | Evaporability at 250° C. (%) | 3 | 13.2 | 13.1 | 13.1 | 14.7 | 12.8 | 12.5 |
| | Friction coefficient | 0.114 | 0.116 | 0.113 | 0.113 | 0.134 | 0.135 | 0.139 |

Examples 49 to 72 and Comparative Examples 7 to 9: Evaluation of 0W-16

A stainless steel vessel equipped with a stirrer was charged with a hydrocarbon oil (SP: 8.3 to 8.4 (cal/cm³)$^{1/2}$; kinematic viscosity at 100° C.: 4.2 mm²/s; viscosity index: 128) (90 parts by weight) and a package additive "Infineum P5741" (10 parts by weight) to obtain lubricating oil compositions. Then, the viscosity-index improving agents (R-1) to (R-24) and (R'-1) to (R'-3) were added to the respective lubricating oil compositions such that each lubricating oil composition has a HTHS viscosity at 150° C. of 2.30±0.05 (mPa·s). Thus, lubricating oil compositions (V-25) to (V-48) and (W-4) to (W-6) were obtained. The following properties of the lubricating oil compositions (V-25) to (V-48) and (W-4) to (W-6) were measured according to the following methods: shear stability (BOSCH SSI, Sonic SSI); HTHS viscosity (150° C., 100° C., 80° C.); kinematic viscosity (100° C., 40° C.); viscosity index; low-temperature viscosity (−40° C.); evaporability at 250° C.; and friction characteristics. Table 7 and Table 8 show the results.

TABLE 7

|  |  | Example | | | | | | |
|---|---|---|---|---|---|---|---|---|
|  |  | 49 | 50 | 51 | 52 | 53 | 54 | 55 |
| Lubricating oil composition | | V-25 | V-26 | V-27 | V-28 | V-29 | V-30 | V-31 |
| Viscosity-index improving agent | | R-1 | R-2 | R-3 | R-4 | R-5 | R-6 | R-7 |
| Amount of copolymer (A) in lubricating oil composition (wt %) | | 1.60 | 1.60 | 1.60 | 1.60 | 1.80 | 1.70 | 1.60 |
| Amount of ester oil (B1) in lubricating oil composition (wt %) | | 1.10 | 1.70 | 3.10 | 4.20 | 3.30 | 2.70 | 0.90 |
| Amount of ester oil (B2) in lubricating oil composition (wt %) | | 1.10 | 1.70 | 3.10 | 4.20 | 0.60 | 0.90 | 2.60 |
| Amount of copolymer (C) in lubricating oil composition (wt %) | | 0.04 | 0.05 | 0.08 | 0.11 | 0.06 | 0.06 | 0.05 |
| Amount of hydrocarbon oil in lubricating oil composition (wt %) | | 87.26 | 86.05 | 83.22 | 80.99 | 85.34 | 85.74 | 85.95 |
| Amount of additives in lubricating oil composition (wt %) | | 8.90 | 8.90 | 8.90 | 8.90 | 8.90 | 8.90 | 8.90 |
| Evaluation results | HTHS viscosity (150° C.) (mPa·s) | 2.3 | 2.3 | 2.3 | 2.3 | 2.3 | 2.3 | 2.3 |
| | HTHS viscosity (100° C.) (mPa·s) | 4.43 | 4.39 | 4.37 | 4.34 | 4.38 | 4.38 | 4.39 |
| | HTHS viscosity (80° C.) (mPa·s) | 6.49 | 6.46 | 6.43 | 6.41 | 6.44 | 6.44 | 6.46 |
| | Kinematic vicsosity at 100° C. (mm²/s) | 6.35 | 6.33 | 6.34 | 6.25 | 6.33 | 6.31 | 6.30 |
| | Kinematic vicsosity at 40° C. (mm²/s) | 25.03 | 24.94 | 24.82 | 24.75 | 24.82 | 24.86 | 24.92 |

TABLE 7-continued

|  | | | | | | | |
|---|---|---|---|---|---|---|---|
| Viscosity index | 224 | 224 | 226 | 221 | 225 | 223 | 222 |
| BOSCH SSI (%) | 2 | 2 | 2 | 2 | 2 | 2.5 | 2.5 |
| Sonic SSI (%) | 28 | 28 | 28 | 28 | 28 | 29 | 29 |
| Low-temperature viscosity (−40° C.) (mPa · s) | 17,000 | 15,000 | 15,000 | 15,000 | 15,000 | 15,500 | 15,500 |
| Evaporability at 250° C. (%) | 12.3 | 12.7 | 13.5 | 14.0 | 13.3 | 13.4 | 13.0 |
| Friction coefficient | 0.117 | 0.116 | 0.116 | 0.114 | 0.125 | 0.119 | 0.119 |

| | | Example | | | | | |
|---|---|---|---|---|---|---|---|
| | | 56 | 57 | 58 | 59 | 60 | 61 |
| Lubricating oil composition | | V-32 | V-33 | V-34 | V-35 | V-36 | V-37 |
| Viscosity-index improving agent | | R-8 | R-9 | R-10 | R-11 | R-12 | R-13 |
| Amount of copolymer (A) in lubricating oil composition (wt %) | | 1.50 | 1.80 | 1.70 | 1.60 | 1.60 | 1.80 |
| Amount of ester oil (B1) in lubricating oil composition (wt %) | | 0.50 | 1.40 | 1.70 | 1.90 | 1.70 | 1.90 |
| Amount of ester oil (B2) in lubricating oil composition (wt %) | | 2.70 | 1.40 | 1.70 | 1.90 | 1.70 | 1.90 |
| Amount of copolymer (C) in lubricating oil composition (wt %) | | 0.05 | 0.06 | 0.06 | 0.05 | 0.00 | 0.06 |
| Amount of hydrocarbon oil in lubricating oil composition (wt %) | | 86.35 | 86.44 | 85.94 | 85.65 | 86.10 | 85.44 |
| Amount of additives in lubricating oil composition (wt %) | | 8.90 | 8.90 | 8.90 | 8.90 | 8.90 | 8.90 |
| Evaluation results | HTHS viscosity (150° C.) (mPa · s) | 2.3 | 2.3 | 2.3 | 2.3 | 2.3 | 2.3 |
| | HTHS viscosity (100° C.) (mPa · s) | 4.39 | 4.44 | 4.40 | 4.37 | 4.40 | 4.41 |
| | HTHS viscosity (80° C.) (mPa · s) | 6.46 | 6.49 | 6.46 | 6.42 | 6.46 | 6.48 |
| | Kinematic vicsosity at 100° C. (mm²/s) | 6.35 | 6.40 | 6.26 | 6.28 | 6.36 | 6.12 |
| | Kinematic vicsosity at 40° C. (mm²/s) | 24.98 | 25.06 | 24.93 | 24.80 | 24.92 | 24.93 |
| | Viscosity index | 224 | 227 | 219 | 222 | 226 | 210 |
| | BOSCH SSI (%) | 2 | 2 | 2 | 2 | 2 | 1 |
| | Sonic SSI (%) | 28 | 28 | 28 | 28 | 28 | 25 |
| | Low-temperature viscosity (−40° C.) (mPa · s) | 16,000 | 18,000 | 16,000 | 14,500 | 18,000 | 15,000 |
| | Evaporability at 250° C. (%) | 12.6 | 12.5 | 13.1 | 13.0 | 12.7 | 13.0 |
| | Friction coefficient | 0.126 | 0.117 | 0.116 | 0.117 | 0.117 | 0.116 |

TABLE 8

| | Example | | | | | | |
|---|---|---|---|---|---|---|---|
| | 62 | 63 | 64 | 65 | 66 | 67 | 68 |
| Lubricating oil composition | V-38 | V-39 | V-40 | V-41 | V-42 | V-43 | V-44 |
| Viscosity-index improving agent | R-14 | R-15 | R-16 | R-17 | R-18 | R-19 | R-20 |
| Amount of copolymer (A) in lubricating oil composition (wt %) | 1.50 | 1.40 | 1.60 | 1.70 | 1.70 | 2.00 | 1.40 |
| Amount of ester oil (B1) in lubricating oil composition (wt %) | 1.60 | 1.50 | 1.80 | 2.40 | 2.40 | 3.90 | 3.50 |
| Amount of ester oil (B2) in lubricating oil composition (wt %) | 1.60 | 1.50 | 1.80 | 2.40 | 2.40 | 1.80 | 2.80 |
| Amount of copolymer (C) in lubricating oil composition (wt %) | 0.06 | 0.05 | 0.07 | 0.07 | 0.07 | 0.07 | 0.12 |

TABLE 8-continued

| | | | | | | | | |
|---|---|---|---|---|---|---|---|---|
| Amount of hydrocarbon oil in lubricating oil composition (wt %) | | 86.34 | 86.65 | 85.83 | 84.53 | 84.53 | 83.33 | 83.28 |
| Amount of additives in lubricating oil composition (wt %) | | 8.90 | 8.90 | 8.90 | 8.90 | 8.90 | 8.90 | 8.90 |
| Evaluation results | HTHS viscosity (150° C.) (mPa · s) | 2.3 | 2.3 | 2.3 | 2.3 | 2.3 | 2.3 | 2.3 |
| | HTHS viscosity (100° C.) (mPa · s) | 4.38 | 4.46 | 4.41 | 4.33 | 4.39 | 4.38 | 4.26 |
| | HTHS viscosity (80° C.) (mPa · s) | 6.42 | 6.51 | 6.47 | 6.40 | 6.44 | 6.41 | 6.40 |
| | Kinematic vicsosity at 100° C. (mm²/s) | 6.42 | 6.27 | 6.10 | 6.15 | 6.16 | 6.19 | 6.20 |
| | Kinematic vicsosity at 40° C. (mm²/s) | 24.77 | 25.10 | 24.95 | 24.72 | 24.93 | 24.98 | 24.94 |
| | Viscosity index | 232 | 218 | 209 | 215 | 213 | 214 | 215 |
| | BOSCH SSI (%) | 3 | 1 | 1 | 1 | 1 | 1 | 4 |
| | Sonic SSI (%) | 30 | 24 | 19 | 16 | 19 | 16 | 35 |
| | Low-temperature viscosity (−40° C.) (mPa · s) | 15,000 | 15,000 | 16,000 | 16,500 | 15,000 | 13,500 | 14,500 |
| | Evaporability at 250° C. (%) | 12.9 | 12.9 | 12.7 | 12.8 | 12.8 | 13.4 | 13.4 |
| | Friction coefficient | 0.115 | 0.117 | 0.116 | 0.116 | 0.119 | 0.115 | 0.117 |

| | | Example | | | | Comparative Example | | |
|---|---|---|---|---|---|---|---|---|
| | | 69 | 70 | 71 | 72 | 7 | 8 | 9 |
| Lubricating oil composition | | V-45 | V-46 | V-47 | V-48 | W-4 | W-5 | W-6 |
| Viscosity-index improving agent | | R-21 | R-22 | R-23 | R-24 | R'-1 | R'-2 | R'-3 |
| Amount of copolymer (A) in lubricating oil composition (wt %) | | 1.60 | 1.60 | 1.60 | 1.60 | 1.60 | 1.50 | 1.60 |
| Amount of ester oil (B1) in lubricating oil composition (wt %) | | 1.70 | 1.70 | 1.70 | 1.70 | 3.40 | 0.00 | 0.00 |
| Amount of ester oil (B2) in lubricating oil composition (wt %) | | 1.70 | 1.70 | 1.70 | 1.70 | 0.00 | 3.20 | 0.00 |
| Amount of copolymer (C) in lubricating oil composition (wt %) | | 0.05 | 0.05 | 0.05 | 0.05 | 0.06 | 0.05 | 0.05 |
| Amount of hydrocarbon oil in lubricating oil composition (wt %) | | 86.05 | 86.05 | 86.05 | 86.05 | 86.04 | 86.35 | 89.45 |
| Amount of additives in lubricating oil composition (wt %) | | 8.90 | 8.90 | 8.90 | 8.90 | 8.90 | 8.90 | 8.90 |
| Evaluation results | HTHS viscosity (150° C.) (mPa · s) | 2.3 | 2.3 | 2.3 | 2.3 | 2.3 | 2.3 | 2.3 |
| | HTHS viscosity (100° C.) (mPa · s) | 4.39 | 4.40 | 4.39 | 4.39 | 4.38 | 4.41 | 4.45 |
| | HTHS viscosity (80° C.) (mPa · s) | 6.44 | 6.47 | 6.47 | 6.47 | 6.45 | 6.50 | 6.69 |
| | Kinematic vicsosity at 100° C. (mm²/s) | 6.30 | 6.38 | 6.35 | 6.35 | 6.30 | 6.33 | 6.29 |
| | Kinematic vicsosity at 40° C. (mm²/s) | 25.00 | 25.02 | 25.00 | 25.00 | 24.89 | 25.10 | 25.80 |
| | Viscosity index | 221 | 226 | 224 | 224 | 222 | 222 | 210 |
| | BOSCH SSI (%) | 2 | 2 | 2 | 2 | 2 | 2 | 2 |
| | Sonic SSI (%) | 28 | 28 | 28 | 28 | 28 | 28 | 27 |
| | Low-temperature viscosity (−40° C.) (mPa · s) | 15,000 | 17,000 | 15,000 | 15,000 | 15,000 | 16,000 | 21,000 |
| | Evaporability at 250° C. (%) | 13.0 | 13.0 | 12.7 | 12.7 | 14.4 | 12.6 | 12.3 |
| | Friction coefficient | 0.118 | 0.120 | 0.116 | 0.116 | 0.136 | 0.138 | 0.142 |

<Method of Measuring HTHS Viscosity of Lubricating Oil Composition>

The HTHS viscosity was measured at 80° C., 100° C., and 150° C. according to the method of ASTM D 4683. It is better when the HTHS viscosity at 80° C. and 100° C. is lower.

<Method of Measuring Kinematic Viscosity and Method of Calculating Viscosity Index of Lubricating Oil Composition>

The kinematic viscosity at 40° C. and 100° C. was measured according to the method of JIS-K2283. The viscosity index was calculated according to the method of JIS-K2283. A higher viscosity index indicates a higher viscosity index improving effect.

<Methods of Measuring and Calculating Shear Stability (BOSCH SSI) of Lubricating Oil Composition>

The shear stability was measured according to the method of ASTM D 6278 and calculated according to the method of ASTM D 6022. A lower value indicates a higher shear stability.

<Methods of Measuring and Calculating Shear Stability (Sonic SSI) of Lubricating Oil Composition>

The shear stability was measured according to the method of JPI-5S-29-2006 and calculated according to the method of ASTM D 6022, using an ultrasonic shear device. A lower value indicates a higher shear stability.

<Method of Measuring Low Temperature Viscosity of Lubricating Oil Composition>

The viscosity at −40° C. was measured according to the method of JPI-5S-42-2004. A lower value indicates a lower low-temperature viscosity.

<Method of Measuring Evaporability>

The evaporation rate at 250° C. was measured according to the method of ASTM D 5800. A smaller value indicates a better engine oil with a lower evaporation rate of the lubricating oil.

<HFRR Method of Measuring Friction Characteristics of the Lubricating Oil Composition>

A high-frequency reciprocating rig (HFRR available from PCS Instruments) was used with a test steel ball made of SUJ2 and having a diameter of 6 mm and a test disk made of SUJ2. The test was performed for 60 minutes to measure the friction coefficient under the following conditions: measurement temperature: 80° C.; load: 3.92 N (400 g); stroke: 1000 μm; and frequency: 20 Hz.

The results in Tables 5 to 8 show that the viscosity-index improving agents of the present invention each have an excellent friction reduction effect. Further, the results show that the viscosity-index improving agents are also excellent in HTHS viscosity, kinematic viscosity at 40° C., viscosity index, shear stability, low-temperature viscosity, and evaporability at 250° C.

In contrast, the lubricating oil compositions of Comparative Examples 4 to 9 comparable to the lubricating oil compositions of Example 26 or 50 except that only one ester oil or no ester oils are present have a very high friction coefficient and poor friction characteristics, as compared to the lubricating oil compositions of Example 26 or 50. In particular, the results of Comparative Examples 4 and 7 show that the evaporability at 250° C. is also poor when only the ester oil (B1) having a kinematic viscosity at 100° C. of 1.00 to 2.50 mm²/s is present. Yet, the results of Example 26 or 50 show that use of the ester oil (B1) in combination with the ester oil (B2) having a kinematic viscosity at 100° C. of 2.51 to 5.00 mm²/s can result in excellent evaporability at 250° C. and can provide a good balance of friction characteristics and evaporability at 250° C.

INDUSTRIAL APPLICABILITY

The lubricating oil compositions containing the viscosity-index improving agent of the present invention has excellent friction characteristics. Thus, the lubricating oil compositions are suitable as gear oils (e.g., differential oil and industrial gear oil), MTF, transmission fluids (e.g., ATF, DCTF, and belt-CVTF), traction fluids (e.g., toroidal-CVTF), shock absorber fluids, power steering fluids, hydraulic oils (e.g., construction machinery hydraulic oil and industrial hydraulic oil), and engine oils (for gasoline and diesel).

The invention claimed is:

1. A viscosity-index improving agent comprising:
    a (co) polymer (A) containing, as an essential constituent monomer, a polyolefin-based monomer (a) represented by the following formula (1);
    an ester oil (B1) having a kinematic viscosity at 100° C. of 1.00 to 2.50 mm²/s; and
    an ester oil (B2) having a kinematic viscosity at 100° C. of 2.51 to 5.00 mm²/s:
    wherein a weight ratio {(B1)/(B2)} of the ester oil (B1) to the ester oil (B2) in the viscosity-index improving agent is 25/75 to 75/25,

[Chem. 1]

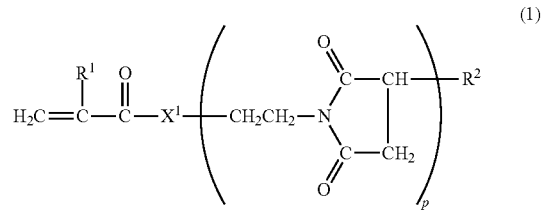

(1)

wherein R¹ is a hydrogen atom or a methyl group; —X¹— is a group represented by —O—, —O(AO)$_m$—, or —NH—, A is a C2-C4 alkylene group, m is an integer of 1 to 10, and each A may be the same or different when m is 2 or more;
R² is a residue after removal of one hydrogen atom from a hydrocarbon polymer containing a 1,2-butylene group as a structural unit; and p represents a number of 0 or 1, and
wherein a difference ((B2)−(B1)) in kinematic viscosity at 100° C. between the ester oil (B1) and the ester oil (B2) in the viscosity-index improving agent is 0.88 to 1.3 mm²/s
wherein a ratio {(A)/((B1)+(B2))} of the weight of the (co)polymer (A) to the total weight of the ester oil (B1) and the ester oil (B2) in the viscosity-index improving agent is 15/85 to 43/57, and
wherein, when the viscosity-index improving agent is added to a lubricating oil composition comprising 76.55 wt. % to 86.04 wt. % of a hydrocarbon oil, the lubricating oil composition has a friction coefficient of 0.112 to 0.123,
wherein the friction coefficient is measured using a high-frequency reciprocating rig with a test steel ball made of SUJ2 and having a diameter of 6 mm and a test disk made of SUJ2 under the following conditions:
measurement temperature: 80° C.;
load: 3.92 N (400 g);
stroke: 1000 μm; and
frequency: 20 Hz.

2. The viscosity-index improving agent according to claim 1,
    wherein a solubility parameter calculated based on weight fractions of the monomers constituting the (co)polymer (A) is 8.0 to 10.0 (cal/cm³)$^{1/2}$.

3. The viscosity-index improving agent according to claim 1,
    wherein the (co)polymer (A) is a copolymer containing, as a constituent monomer, at least one of a (meth)

acrylic acid alkyl ester monomer (b) having a C1-C4 alkyl group and a (meth)acryloyl monomer (c) having a C9-C36 straight-chain or branched alkyl group.

4. The viscosity-index improving agent according to claim 1,
wherein the (co)polymer (A) is a copolymer containing a monomer (d) represented by the following formula (3):

[Chem. 2]

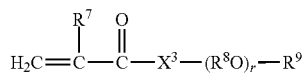

(3)

wherein $R^7$ is a hydrogen atom or a methyl group; $-X^3-$ is a group represented by $-O-$ or $-NH-$; $R^8$ is a C2-C4 alkylene group; $R^9$ is a C1-C8 alkyl group; and r is an integer of 1 to 20, and each $R^8$ may be the same or different when r is 2 or more.

5. The viscosity-index improving agent according to claim 1,
wherein the (co)polymer (A) is a copolymer containing, as constituent monomers, a (meth)acrylic acid alkyl ester monomer (b) having a C1-C4 alkyl group in an amount of 1 to 80 wt %, a (meth)acryloyl monomer (c) having a C9-C36 straight-chain or branched alkyl group in an amount of 1 to 60 wt %, and a monomer (d) represented by the following formula (3) in an amount of 2 to 35 wt % based on the total weight of the monomers constituting the (co)polymer (A):

[Chem. 3]

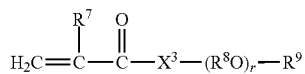

(3)

wherein $R^7$ is a hydrogen atom or a methyl group; $-X^3-$ is a group represented by $-O-$ or $-NH-$; $R^8$ is a C2-C4 alkylene group; $R^9$ is a C1-C8 alkyl group; and r is an integer of 1 to 20, and each $R^8$ may be the same or different when r is 2 or more.

6. The viscosity-index improving agent according to claim 1,
wherein the (co)polymer (A) has a weight average molecular weight of 5,000 to 2,000,000.

7. The viscosity-index improving agent according to claim 1,
wherein the viscosity-index improving agent contains a (meth)acrylic acid alkyl ester (co)polymer (C) different from the (co)polymer (A) in an amount of 0.01 to 30 wt % based on the weight of the (co)polymer (A).

8. The viscosity-index improving agent according to claim 1, further containing a hydrocarbon oil.

9. A lubricating oil composition comprising:
the viscosity-index improving agent according to claim 1; and
at least one additive selected from the group consisting of a detergent, a dispersant, an antioxidant, an oiliness improver, a pour point depressant, a friction and wear modifier, an extreme pressure agent, a defoamer, a demulsifier, a metal deactivator, and a corrosion inhibitor; and
wherein the lubricating oil composition has a friction coefficient of 0.112 to 0.123,
wherein the friction coefficient is measured using a high-frequency reciprocating rig with a test steel ball made of SUJ2 and having a diameter of 6 mm and a test disk made of SUJ2 under the following conditions:
measurement temperature: 80° C.;
load: 3.92 N (400 g);
stroke: 1000 μm; and
frequency: 20 Hz.

* * * * *